(12) United States Patent
Danielsen

(10) Patent No.: US 10,544,776 B2
(45) Date of Patent: Jan. 28, 2020

(54) INJECTION METHOD AND DEVICE FOR CONNECTING AND REPAIRING A SHEAR WEB

(71) Applicant: General Electric Company, Schenectady, NY (US)

(72) Inventor: Darren John Danielsen, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 189 days.

(21) Appl. No.: 15/661,494

(22) Filed: Jul. 27, 2017

(65) Prior Publication Data
US 2019/0032632 A1 Jan. 31, 2019

(51) Int. Cl.
*F03D 1/06* (2006.01)
*F03D 80/50* (2016.01)

(52) U.S. Cl.
CPC ........... *F03D 1/0675* (2013.01); *F03D 80/50* (2016.05); *F05B 2230/23* (2013.01); *F05B 2230/60* (2013.01); *F05B 2230/80* (2013.01); *F05B 2250/311* (2013.01)

(58) Field of Classification Search
CPC .... F03D 1/0675; F03D 80/50; F05B 2230/80; F05B 2250/311
See application file for complete search history.

(56) References Cited

U.S. PATENT DOCUMENTS

| 4,295,790 A | 10/1981 | Eggert, Jr. |
| 4,671,470 A | 6/1987 | Jonas |
| 7,393,488 B2 | 7/2008 | Grose et al. |
| 7,810,757 B2 | 10/2010 | Kirkwood et al. |
| 7,841,835 B2 | 11/2010 | Bagepalli et al. |
| 7,922,454 B1 | 4/2011 | Riddell |
| 8,167,569 B2 | 5/2012 | Livingston |
| 8,171,633 B2 | 5/2012 | Zirin et al. |
| 8,257,048 B2 | 9/2012 | Yarbrough |
| 8,382,440 B2 | 2/2013 | Baker et al. |
| 8,393,872 B2 | 3/2013 | Yarbrough |

(Continued)

FOREIGN PATENT DOCUMENTS

| EP | 1806285 A1 | 7/2007 |
| EP | 2 634 417 A2 | 9/2013 |

OTHER PUBLICATIONS

International Search Report and Written Opinion issued in connection with corresponding PCT Application No. PCT/US2018/042805 dated Nov. 16, 2018.

*Primary Examiner* — Ninh H. Nguyen
(74) *Attorney, Agent, or Firm* — Dority & Manning, P.A.

(57) ABSTRACT

A method and device for connecting and repairing a shear web includes the method steps of dry-fitting a shear web insert in a rotor blade assembly to establish a perimeter gap at an angled perimeter interface between the shear web insert and the rotor blade assembly, the angled perimeter interface positioned between the shear web insert and at least one adjacent surface of a first shear web, a second shear web, a first side of the rotor blade assembly, and a second side of the rotor blade assembly, and then injecting a bonding paste into the perimeter gap. The rotor blade assembly can include a connecting device having at least one pre-fabricated clip.

17 Claims, 17 Drawing Sheets

(56) References Cited

U.S. PATENT DOCUMENTS

| | | | |
|---|---|---|---|
| 8,409,381 B2 * | 4/2013 | Ramm | F03D 1/0675 156/125 |
| 8,449,259 B1 | 5/2013 | Kaser | |
| 8,500,409 B2 * | 8/2013 | Baker | F03D 1/0675 416/226 |
| 8,517,689 B2 * | 8/2013 | Kyriakides | F03D 1/0675 416/226 |
| 8,632,312 B2 | 1/2014 | Jensen et al. | |
| 8,764,401 B2 | 7/2014 | Hayden et al. | |
| 8,898,901 B2 | 12/2014 | Richter et al. | |
| 8,973,871 B2 | 3/2015 | Marcoe et al. | |
| 9,297,357 B2 | 3/2016 | Busbey et al. | |
| 9,470,205 B2 | 10/2016 | Liu et al. | |
| 9,506,452 B2 | 11/2016 | Bakhuis et al. | |
| 2011/0052403 A1 | 3/2011 | Kawasetsu et al. | |
| 2011/0135485 A1 | 6/2011 | Wang | |
| 2011/0142663 A1 | 6/2011 | Gill | |
| 2013/0129518 A1 | 5/2013 | Hayden et al. | |
| 2013/0219718 A1 | 8/2013 | Busbey et al. | |
| 2013/0224032 A1 | 8/2013 | Busbey et al. | |
| 2014/0260849 A1 * | 9/2014 | Johnson | F03D 1/0675 83/39 |
| 2014/0271198 A1 | 9/2014 | Liu et al. | |
| 2014/0271217 A1 | 9/2014 | Baker | |
| 2015/0152839 A1 | 6/2015 | Busbey et al. | |
| 2015/0251370 A1 | 9/2015 | Kirkeby et al. | |
| 2016/0146185 A1 | 5/2016 | Yarbrough et al. | |
| 2016/0169195 A1 | 6/2016 | Johnson et al. | |
| 2016/0348644 A1 | 12/2016 | Hayden et al. | |
| 2017/0021575 A1 | 1/2017 | Hansen et al. | |
| 2017/0074240 A1 | 3/2017 | Caruso et al. | |
| 2017/0122287 A1 * | 5/2017 | Dobbe | F03D 1/0675 |

* cited by examiner

200

| 202 — DRY-FITTING SHEAR WEB INSERT IN A ROTOR BLADE ASSEMBLY TO ESTABLISH A PERIMETER GAP AT AN ANGLED PERIMETER INTERFACE BETWEEN THE SHEAR WEB INSERT AND THE ROTOR BLADE ASSEMBLY, THE ANGLED PERIMETER INTERFACE POSITIONED BETWEEN THE SHEAR WEB INSERT AND AT LEAST ONE ADJACENT SURFACE COMPRISING A FIRST SHEAR WEB, A SECOND SHEAR WEB, A FIRST SIDE OF THE ROTOR BLADE ASSEMBLY, AND A SECOND SIDE OF THE ROTO BLADE ASSEMBLY. |

204 — INJECTION A BONDING PASTE INTO THE PERIMETER GAP.

FIG. 10

INJECTION METHOD AND DEVICE FOR CONNECTING AND REPAIRING A SHEAR WEB

FIELD OF THE INVENTION

The present subject matter relates generally to wind turbines and, more particularly, to bonding paste injection methods and devices for connecting and repairing a shear web joint in a blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more turbine blades. The turbine blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally known, the deflection of a rotor blade is a function of blade length, along with wind speed, turbine operating states and blade stiffness. Thus, longer rotor blades may be subject to increased deflection forces, particularly when a wind turbine is operating in high-speed wind conditions. These increased deflection forces not only produce fatigue on the rotor blades and other wind turbine components but may also increase the risk of the rotor blades striking the tower.

In order to increase the length of wind turbine rotor blades without adversely affecting the aerodynamic design, a blade insert can be used to increase the span of a rotor blade by an amount generally corresponding to the overall length of the blade insert. In addition, improved methods for installing shear web inserts between the blade insert and an adjacent segment of the rotor blade are being developed for rotor blades that generally include a suction side shell and a pressure side shell and are typically formed using molding processes that are bonded together at bond lines along the leading and trailing edges of the blade. The pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web insert configured therebetween) that engage the inner pressure and suction side surfaces of the shell halves.

Such rotor blades, however, are not without issues. One particular issue that has arisen involves the connection of shear clips and shear web inserts and clips in rotor blade extensions. Shear clips have been typically utilized to reinforce the interface between the shear web and spar caps, and are connected to both such components at the shear web—spar cap interface. Because thermoset resins are generally utilized to form such rotor blades, thermoset-based joining techniques such as the application of bonding pastes or hand lay-ups must be utilized to attach the shear clips to the shear web inserts and spar caps. It can thus be difficult and time-consuming to join shear clips and shear web inserts in rotor blades. Further, in many cases, the shear clips and shear web inserts may not completely align with the neighboring shear web and/or spar cap surfaces thereby forming an offset or misalignment. These misalignments occur outside of manufacturing tolerances when connecting the shear web and spar caps. Accordingly, the resulting joints may be sub-optimal.

Accordingly, improved methods for connecting and repairing shear web inserts in wind turbine rotor blades, including modular blades, would be advantageous.

BRIEF DESCRIPTION OF THE INVENTION

Aspects and advantages of the invention will be set forth in part in the following description, or may be obvious from the description, or may be learned through practice of the invention.

In one aspect, a method for connecting and repairing a shear web includes the steps of; dry-fitting a shear web insert in a rotor blade assembly to establish a perimeter gap at an angled perimeter interface between the shear web insert and the rotor blade assembly, the angled perimeter interface positioned between the shear web insert and at least one adjacent surface having a first shear web, a second shear web, a first side of the rotor blade assembly, and a second side of the rotor blade assembly, and then injecting a bonding paste into the perimeter gap.

In another aspect, a rotor blade assembly for a wind turbine is disclosed as having a first side and a second side, wherein the first side of the rotor blade assembly corresponds to one of a pressure side or a suction side of the rotor blade assembly, and an opposite second side of the rotor blade assembly corresponds to the other pressure side or suction side of the rotor blade assembly. The rotor blade assembly further has a first blade segment defining a joint end, the first blade segment including a first shear web with an angled interface at the joint end, and a second blade segment coupled to the joint end of the first blade segment, the second blade segment including a second shear web with an angled interface at the joint end.

At least one first connecting device is coupled across at least a portion of the joint end, the at least one first connecting device is coupled at least partially on the first side face of at least one of the first shear web and the second shear web. At least one second connecting device is coupled across at least a portion of the joint end, the at least one second connecting device coupled at least partially on the opposing second side face of at least one of the first shear web and the second shear web. Bonding paste is injected into the angled interface.

In another aspect, a connecting device is disclosed as having at least one pre-fabricated clip with horizontal and vertical portions, the at least one pre-fabricated clip horizontal portions are coupled to at least one of the inner surface of the first side of the rotor blade assembly and the inner surface of the opposite second side of the rotor blade assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 illustrates a flow diagram of one embodiment of a method for installing a shear web insert within the rotor blade assembly shown in FIGS. 7-9;

DETAILED DESCRIPTION OF THE INVENTION

Figure 1:
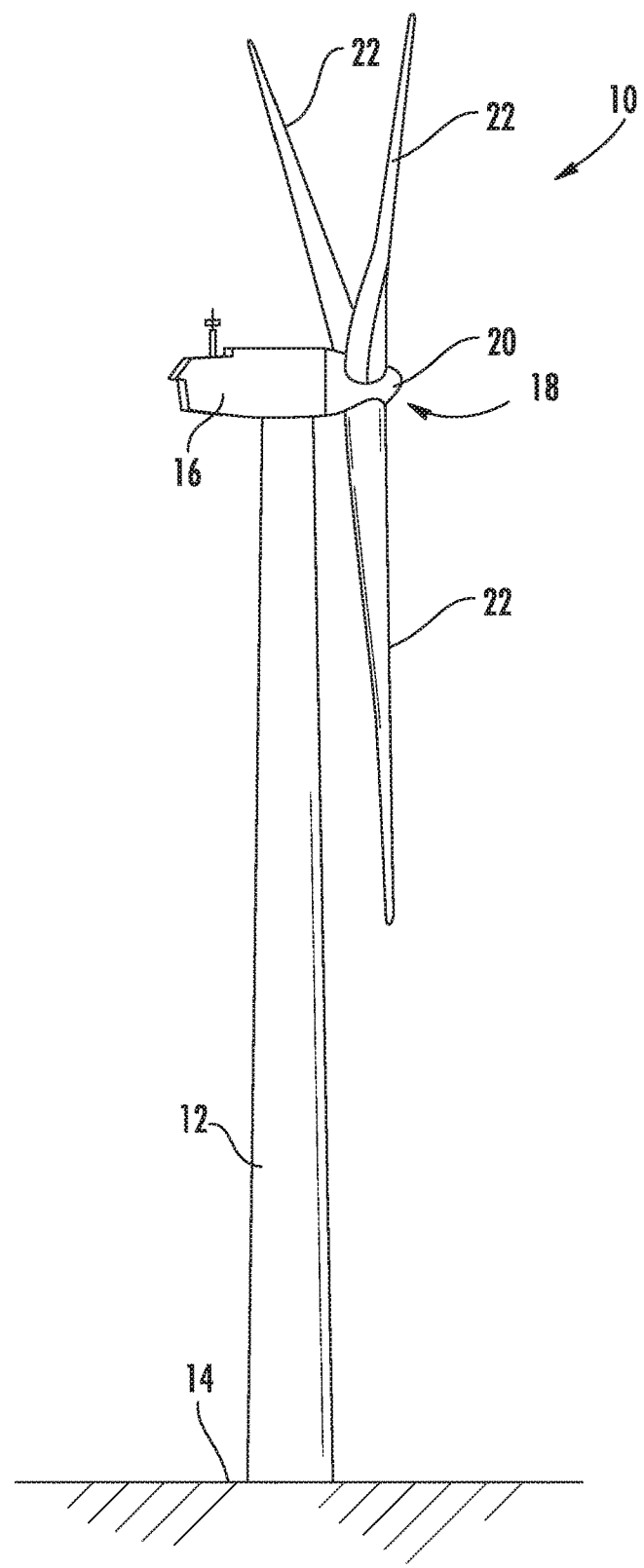
FIG. 1 illustrates a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to methods and devices for installing a horizontal shear web insert between a blade segment and a blade insert of a rotor blade assembly. The methods described herein are not limited only to blade inserts but can be used for any blade joint involving a shear web, for example in assembling modular blades. Specifically, in several embodiments, the blade segment and the blade insert may each include a shear web extending longitudinally therein. Due to the configuration of the blade insert and/or the blade segment, a gap may be defined between the shear webs of such components. As a result, a shear web insert must be installed across the gap defined between the blade shear webs. As will be described below, the blade insert may, in several embodiments, include an elongated projection generally aligned with one of its spar caps that extends to the blade segment, thereby preventing the shear web insert from being installed vertically between the shear webs. Thus, in accordance with aspects of the present subject matter, the disclosed method may be utilized to install the shear web insert horizontally between the shear webs.

The horizontal shear web installation can be difficult and messy. The injection method and devices disclosed herein allows the shear web to be positioned in a horizontal fashion without using bond paste to hold position but using spacers instead. Then once positioned, bond paste is injected into a perimeter gap to complete the joint. The shear web insert can be tapered to form an angled interface cut around the interface to allow proper flow of the bond paste. Without the proper angled interface, the bond paste would either not flow to the other side properly (if gap was too small) or allow too much bond paste flow to the other side (if gap is too large). The horizontal shear web insert installation method and devices disclosed herein can use at least one connecting device, such as a two-piece c-clip, at the joint between the blade shear webs and the shear web insert as a shear clip. This was previously done with a laminated connection having a separate pre-cure cycle step in between. The two piece c-clip connecting device, or shear clip, disclosed herein allows installation of a prefabricated c-clip without requiring a pre-cure step and also does not require additional sanding and prep before installation. The two-piece c-clip can be overlapped thereby allowing a generically sized c-clip to be installed in blades with varying dimensions due to tolerances and does not need to be pre-sized ahead of time. The c-clip can also be tapered in multiple areas to reduce stress concentrations. The injection method and devices disclosed herein can eliminate a pre-cure cycle, reduce cycle time, reduce messiness, and provide a better joint while eliminating previous paste application issues.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
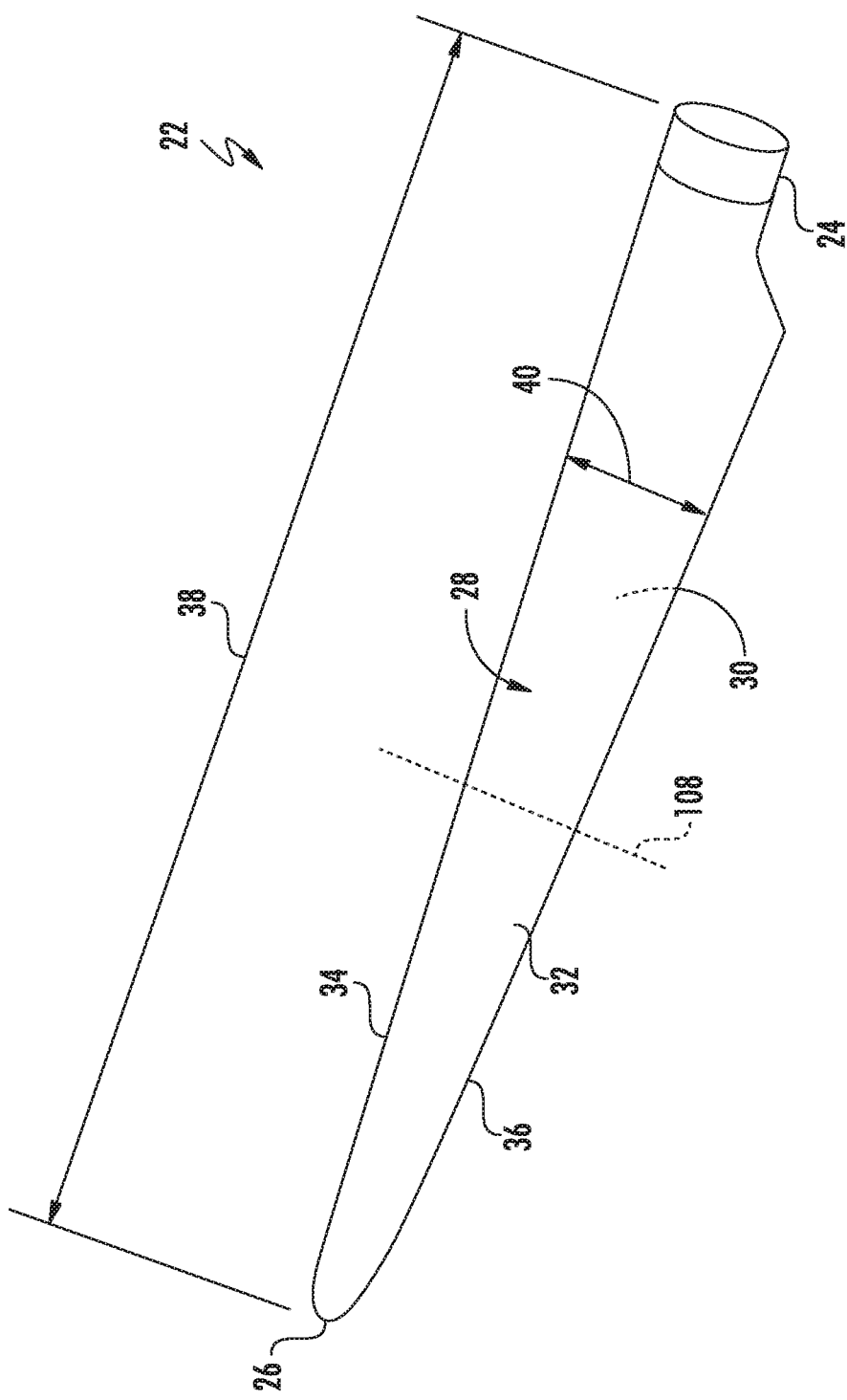
FIG. 2 illustrates a perspective view of one embodiment of one of the rotor blades of the wind turbine shown in FIG. 1.

Referring now to FIG. 2, a perspective view of one of the rotor blades 22 shown in FIG. 1 is illustrated. As shown, the rotor blade 22 generally includes a blade root 24 configured for mounting the rotor blade 22 to the hub 20 of the wind turbine 10 (FIG. 1) and a blade tip 26 disposed opposite the blade root 24. A body 28 of the rotor blade 22 may generally be configured to extend between the blade root 24 and the blade tip 26 and may serve as the outer casing/skin of the blade 22. In several embodiments, the body 28 may define a substantially aerodynamic profile, such as by defining a symmetrical or cambered airfoil-shaped cross-section. As such, the body 28 may include a pressure side 30 and a suction side 32 extending between a leading edge 34 and a trailing edge 36. Further, the rotor blade 22 may have a span 38 defining the total length between the blade root 22 and the blade tip 24 and a chord 40 defining the total length between the leading edge 34 and the trailing edge 36. As is generally understood, the chord 40 may vary in length with respect to the span 38 as the rotor blade 22 extends from the blade root 22 to the blade tip 24.

Figure 6:
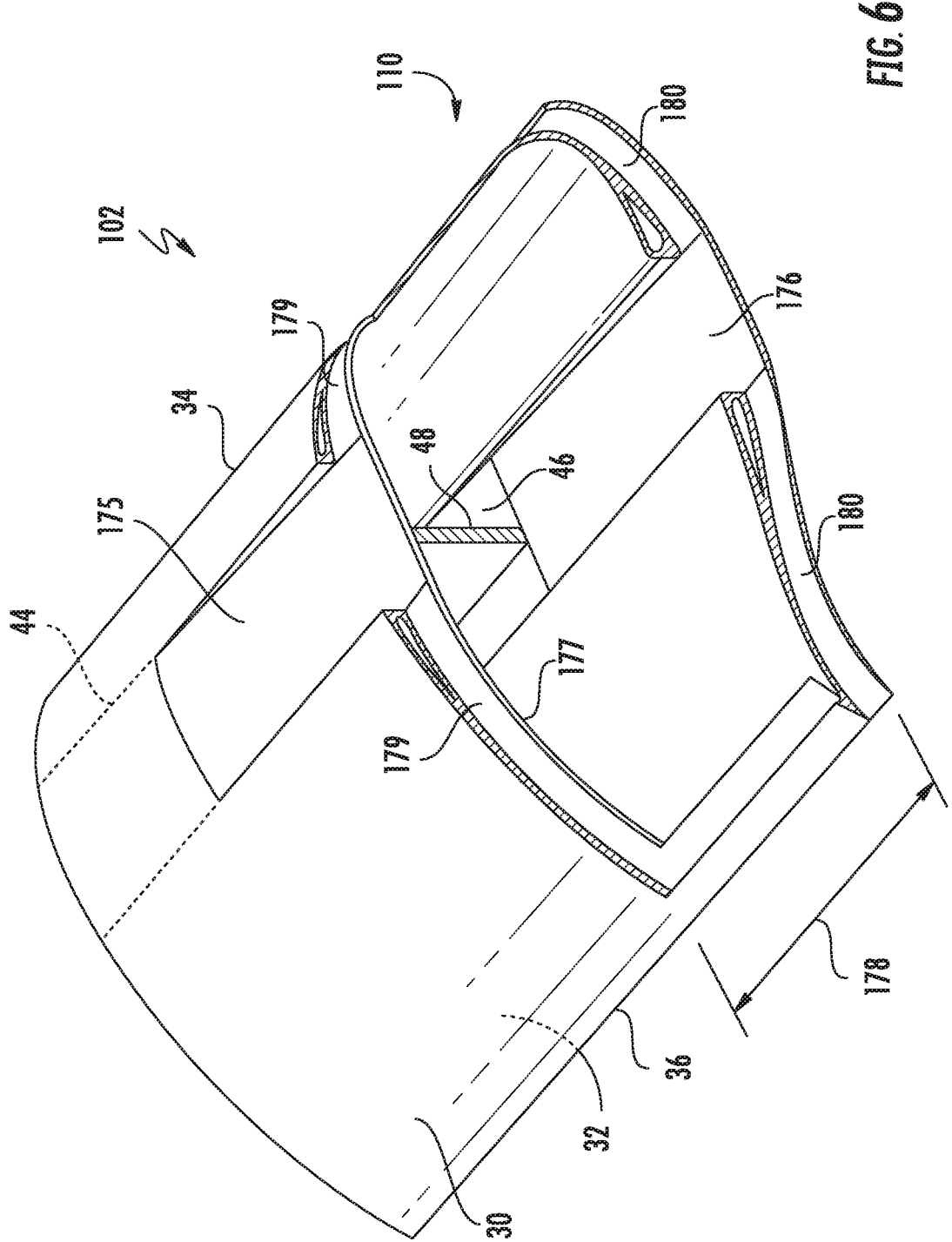
FIG. 6 illustrates a perspective view of one embodiment of a blade segment configuration that may be utilized with the disclosed rotor blade assembly in accordance with aspects of the present subject matter.

In several embodiments, the body 28 of the rotor blade 22 may be formed as a single, unitary component. Alternatively, the body 28 may be formed from a plurality of shell components. For example, the body 28 may be manufactured from a first shell half generally defining the pressure side 30 of the rotor blade 22 and a second shell half generally defining the suction side 32 of the rotor blade 20, with the shell halves being secured to one another at the leading and trailing edges 34, 36 of the blade 22. Additionally, the body 28 may generally be formed from any suitable material. For instance, in one embodiment, the body 28 may be formed entirely from a laminate composite material, such as a carbon fiber reinforced laminate composite or a glass fiber reinforced laminate composite. Alternatively, one or more portions of the body 28 may be configured as a layered construction and may include a core material 42 (e.g., as shown in FIG. 6), formed from a lightweight material such as wood (e.g., balsa), foam (e.g., extruded polystyrene foam) or a combination of such materials, disposed between layers of laminate composite material.

It should be appreciated that the rotor blade 22 may also include one or more longitudinally extending structural components configured to provide increased stiffness, buckling resistance and/or strength to the rotor blade 22. For example, in several embodiments, the rotor blade 22 may include a pair of spar caps (e.g., a top spar cap 44 and a bottom spar cap 46) and one or more shear webs 48, 146 extending between the opposed spar caps 44, 46 (e.g., as shown in FIG. 6).

Figure 3:
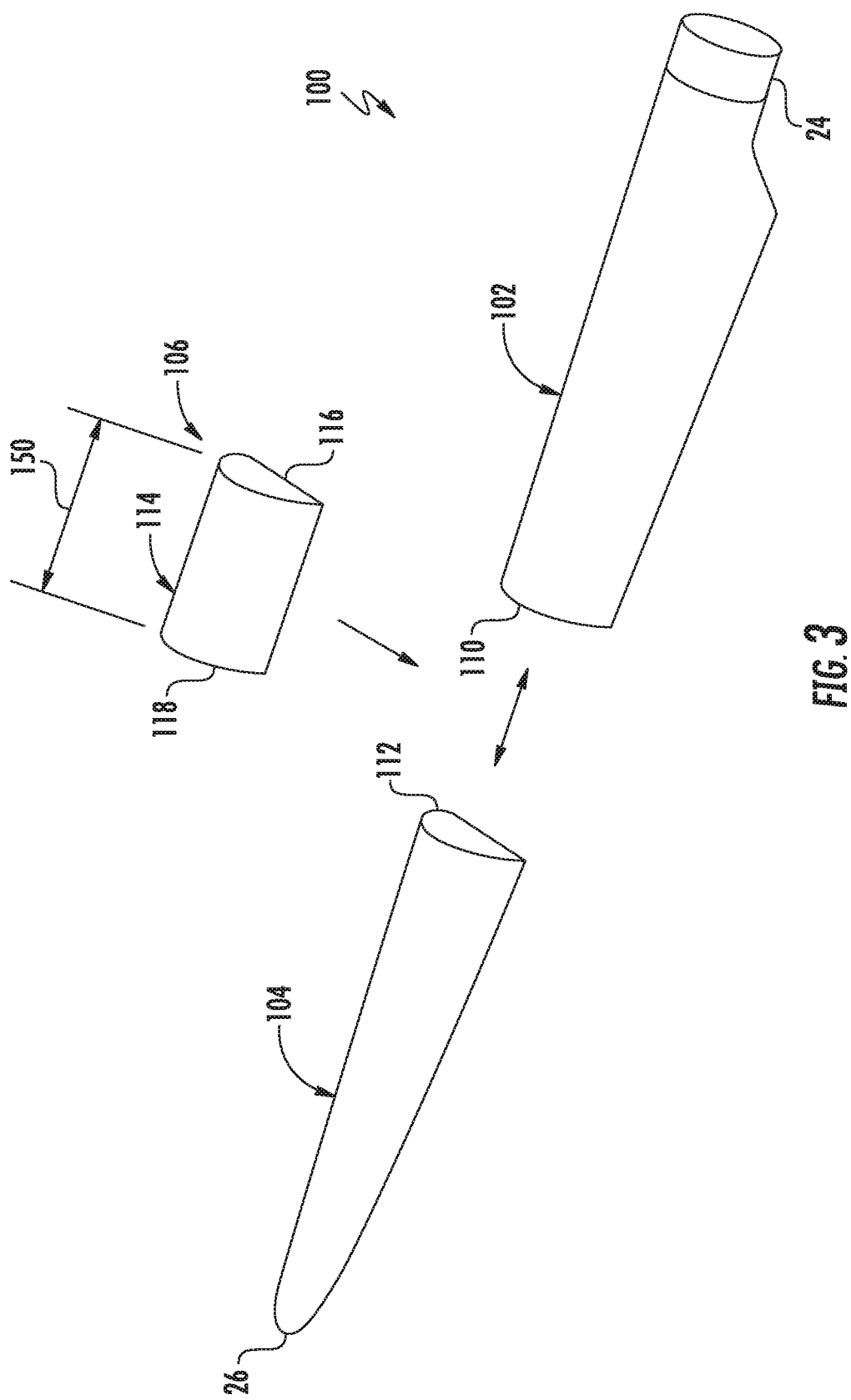
FIG. 3 illustrates an exploded view of one embodiment of a rotor blade assembly in accordance with aspects of the present subject matter.

Referring now to FIG. 3, one embodiment of a rotor blade assembly 100 is illustrated in accordance with aspects of the present subject matter. As shown, the rotor blade assembly 100 may include a first blade segment 102, a second blade segment 104 and a blade insert 106 configured to be coupled between the first and second blade segments 102, 104. In general, the rotor blade assembly 100 may be configured such that, when the first and second blade segments 102, 104 are coupled together via the blade insert 106, a complete rotor blade is formed.

In several embodiments, the first and second blade segments 102, 104 may be formed by dividing a pre-existing rotor blade 22 into two separate blade sections. For example, as shown in FIG. 2, in one embodiment, the illustrated rotor blade 22 may be divided into the first and second blade segments 102, 104 by cutting the rotor blade 22 along a joint or cut line 108. Thus, in the illustrated embodiment, the first blade segment 102 may correspond to a root segment of the rotor blade 22 and may extend between the blade root 24 and a first joint end 110 formed at the cut line 108. Similarly, in the illustrated embodiment, the second blade segment 104 may correspond a tip segment of the rotor blade 22 and may extend between the blade tip 26 and a second joint end 112 formed at the cut line 108.

It should be appreciated that, although the first blade segment 102 is shown as a root segment and the second blade segment 104 is shown as a tip segment, the terms "first blade segment" and "second blade segment" may generally refer to any suitable segments or sections of the rotor blade 22. For example, in another embodiment, the first blade segment 102 may correspond to a tip segment of the rotor blade 22 and the second blade segment 104 may correspond to a root segment of the rotor blade 22. In a further embodiment, the first and second blade segments 102, 104 may correspond to shorter segments of the rotor blade 22.

Additionally, it should be appreciated that, as used herein, the terms "first blade segment" and "second blade segment" need not be limited to a single, continuous blade segment. For example, in the illustrated embodiment, the first blade segment 102 may be formed from a single, unitary blade segment extending between the blade root 24 and the first joint end 110 or the first blade segment 102 may be formed from two or more blade segments that, when coupled together, extend between blade root 24 and the first joint end 110. Similarly, in the illustrated embodiment, the second blade segment 104 may be formed from a single, unitary blade segment extending between the second joint end 112 and the blade tip 26 or the second blade segment 104 may be formed from two or more blade segments that, when coupled together, extend between the second joint end 112 and the blade tip 26.

Moreover, it should be appreciated that the cut line 108 (FIG. 2) may generally be located at any suitable position along the span 38 of the rotor blade 22. For example, in one embodiment, the distance of the cut line 108 from the blade root 24 may range from about 40% to about 95% of the span 38, such as from about 40% to about 80% of the span 28 or from about 50% to about 65% of the span 38. However, it is foreseeable that, in other embodiments, the distance of the cut line 108 from the blade root 34 may be less than 40% of the span 38 or greater than 95% of the span 38.

It should also be appreciated that, in alternative embodiments, the first and second blade segments 102, 104 need not be formed by cutting or otherwise dividing a pre-existing rotor blade 22 into two separate blade sections. For example, in another embodiment, the first and second blade segments 102, 104 may be separately manufactured as modular blades and assembled together with the blade insert 106 to form the disclosed rotor blade assembly 100.

Referring still to FIG. 3, the blade insert 106 of the rotor blade assembly 100 may generally comprise an elongated, aerodynamic body 114 extending between a forward end 116 and an aft end 118, thereby forming a separate blade segment of the rotor blade assembly 100. In general, the blade insert 106 may be configured to be coupled between the first and second blade segments 102, 104 in order to form the rotor blade assembly 100. Specifically, the forward end 116 of the blade insert 106 may be configured to be coupled to the joint end 110 of the first blade segment 102, and the aft end 118 of the blade insert 106 may be configured to be coupled to the joint end 112 of the second blade segment 104. Suitable configurations and methods for attaching the blade insert 106 between the first and second blade segments 102, 104 will generally be described below with reference to FIGS. 4-9.

Figure 4:
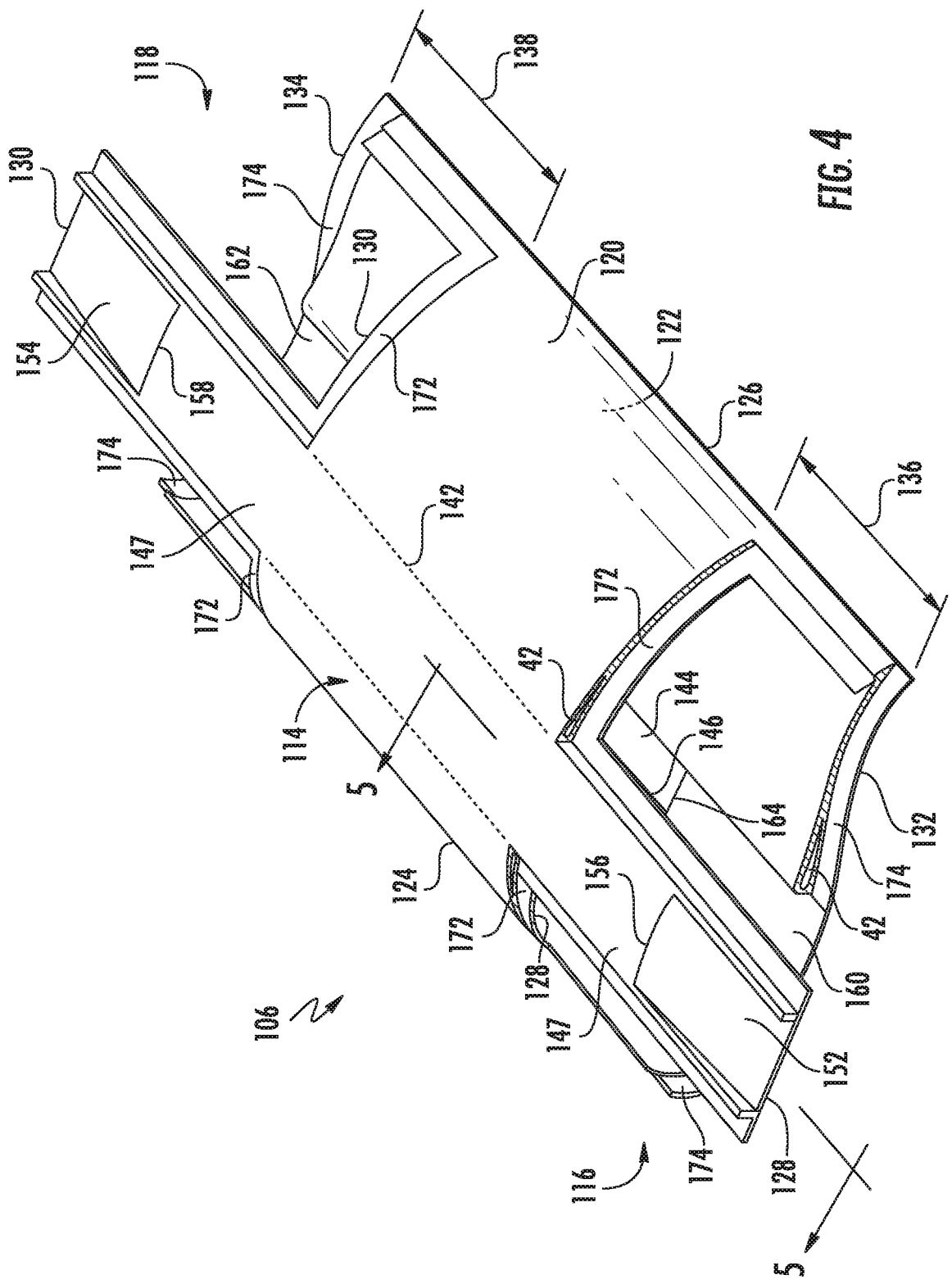
FIG. 4 illustrates a perspective view of one embodiment of a blade insert configuration that may be utilized with the disclosed rotor blade assembly in accordance with aspects of the present subject matter.
Figure 5:
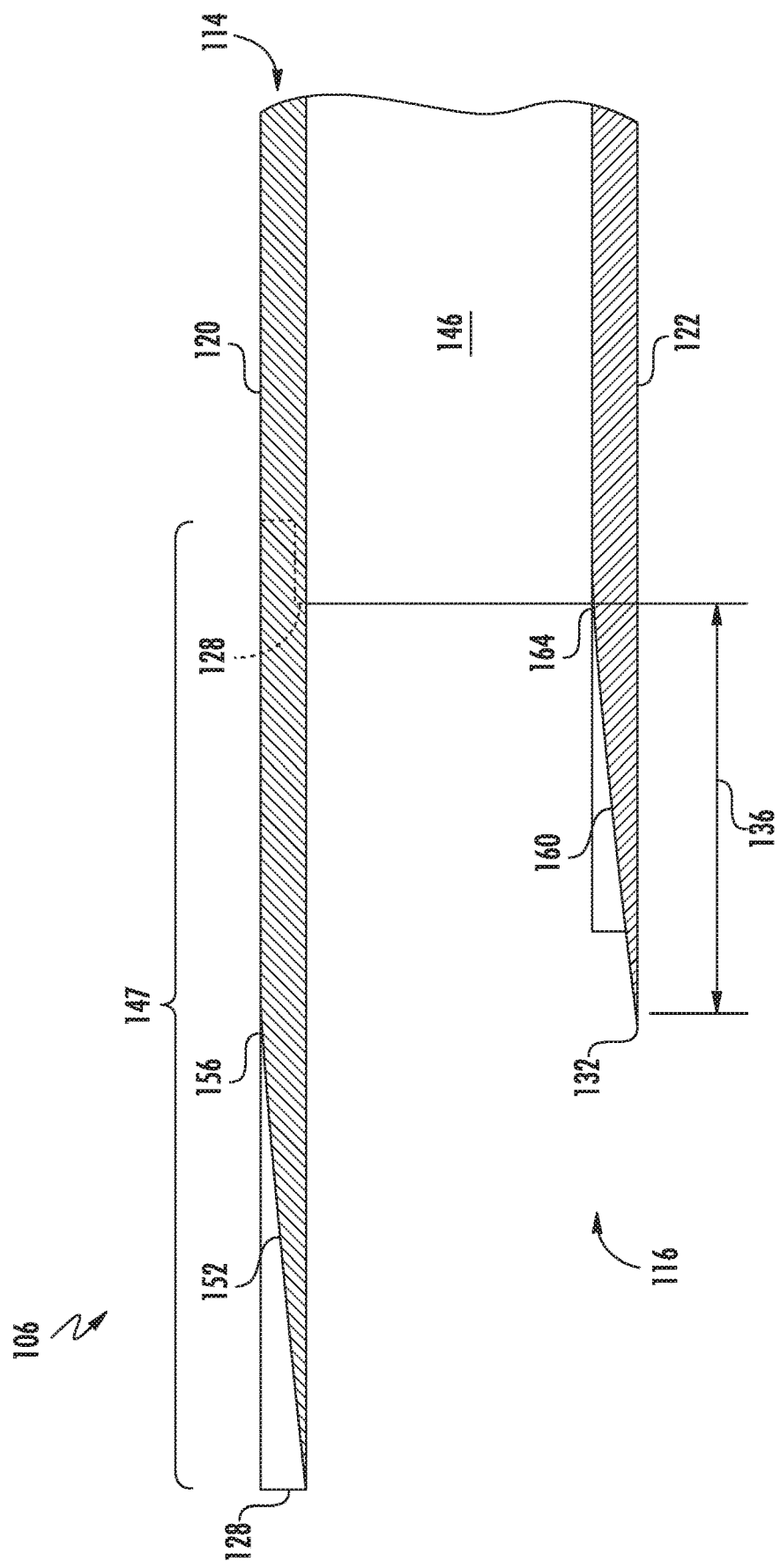
FIG. 5 illustrates a cross-sectional view of a portion of the blade insert shown in FIG. 4 taken about line 5-5.

Referring now to FIGS. 4-6, one embodiment of a particular blade insert/segment configuration that may be used to effectively and efficiently secure a blade insert 106 between first and second blade segments 102, 104 of a rotor blade assembly 100 is illustrated in accordance with aspects of the present subject matter. Specifically, FIG. 4 illustrates a perspective view of the blade insert 106 and FIG. 5 illustrates a partial, cross-sectional view of the blade insert 106 shown in FIG. 4 taken about line 5-5. Additionally, FIG. 6 illustrates a perspective view of a corresponding configuration that may be used for the first blade segment 102 and/or the second blade segment 104.

As indicated above, the blade insert 106 may generally include an elongated body 114 extending between a forward end 116 and an aft end 118, with the forward end 116 configured to be coupled to the joint end 110 of the first blade segment 102 and the aft end 118 being configured to be coupled to the joint end 112 of the second blade segment 104. In general, the body 114 may be configured to define a substantially aerodynamic profile, such as by defining a symmetric or cambered airfoil-shaped cross-section. Thus, as shown in FIGS. 4 and 5, the body 114 may include a top side 120 (e.g., a pressure side) and a bottom side 122 (e.g., suction side) extending between a leading edge 124 and a trailing edge 126. Additionally, as shown, the top side 120 of the body 114 may be configured to extend spanwise between a forward edge 128 disposed at the forward end 116 of the blade insert 106) and an aft edge 130 disposed at the aft end 118 of the blade insert 106. Similarly, the bottom side 122 of the body 114 may be configured to extend spanwise between a forward edge 132 (disposed at the forward end 116 of the blade insert 106 and an aft edge 134 disposed at the aft end 118 of the blade insert 106.

The blade insert 106 may also include the same or similar internal structural components as the first and second blade segments 102, 104. For example, as shown in FIG. 4, the blade insert 106 may include a pair of longitudinally extending spar caps (e.g., a top spar cap 142 and a bottom spar cap 144), with each spar cap 142, 144 being integrated into and/or forming part of either the top side 120 or the bottom side 122 of the blade insert 106. In addition, the blade insert 106 may include one or more shear webs 146 (FIG. 5) extending between the opposed spar caps 142, 144.

Additionally, in several embodiments, a portion of the top side 120 of the blade insert 106 may be recessed or offset from the forward and aft edges 132, 134 of the bottom side 122 of the blade insert 106. For example, as shown in FIG. 4, portions of the top side 120 may be inwardly offset from the forward edge 132 of the bottom side 122 by a first spanwise distance 136 along either side of the top spar cap 142, thereby defining separate offset portions of the forward edge 128 of the top side 120. Similarly, portions of the top side 120 may also be inwardly offset from the aft edge 134 of the bottom side 122 by a second spanwise distance 138 along either side of the top spar cap 142, thereby defining separate offset portions of the aft edge 130 of the top side 120. As will be described below, by offsetting portions of the top side 120 as shown in FIG. 4, separate access windows 140, 141 (see FIG. 7) may be defined at each end 116, 118 of the blade insert 106 when the insert 106 is positioned between the first and second blade segments 102, 104. Such access windows 140, 141 may generally allow for service workers to access the interior of the rotor blade assembly 100, thereby allowing various components to be positioned within the assembly 100 to facilitate securing the blade insert 106 between the blade segments 102, 104. For example, as will be described below, a shear web insert 183 may be inserted through one of the access windows 140, 141 and installed horizontally between the blade insert 106 and the blade segments 102, 104 to couple the shear web of the blade segments 102, 104 to the shear web insert 183 of the blade insert 106.

It should be appreciated that the first and second spanwise distances 136, 138 may generally correspond to any suitable distance. Additionally, in one embodiment, the first spanwise distance 136 may be equal to the second spanwise distance 138. Alternatively, the first spanwise distance 136 may be greater or less than the second spanwise distance 138.

It should also be appreciated that, as used herein, the terms "forward" and "aft" are simply used to distinguish the opposed ends 110, 112 and/or edges 128, 130, 132, 134 of the blade insert 106. Thus, although the forward end 110 of the blade insert 106 is described herein as being configured to be coupled to the joint end 110 of the first blade segment 102, the aft end 112 of the blade insert 106 may instead be configured to be coupled to the first blade segment 102. Similarly, as used herein, the terms "top" and "bottom" are simply used to distinguish the opposed sides 120, 122 of the blade insert 106. For example, in the illustrated embodiment, the top side 120 of the blade insert 106 corresponds to the pressure side while the bottom side 122 corresponds to the suction side. However, in another embodiment, the top side 120 of the blade insert 106 may correspond to the suction side while the bottom side 122 may correspond to the pressure side.

Additionally, in several embodiments, a portion(s) of the top side 120 of the blade insert 106 may also be configured to extend beyond the forward and aft edges 132, 134 of the bottom side 122 of the blade insert 106. Specifically, as shown in FIGS. 4 and 5, elongated portions 147 of the top side 120 (generally aligned with the top spar cap 142) may extend beyond the forward and aft edges 132, 134 of the bottom side 122, thereby defining extended portions of the forward and aft edges 128, 130 of the top side 120. As will be described below, such elongated portions 147 of the top side 120 may be configured to extend to a location at and/or adjacent to the joint ends 110, 112 of the blade segments 102, 104 when the blade insert 106 is positioned between the blade segments 102, 104.

Moreover, in several embodiments, one or more tapered or scarfed sections may be defined along the top and bottom sides 120, 122 of the blade insert 106. For example, as shown in FIG. 4, first and second top scarfed sections 152, 154 may be defined along the outer surface of the top side 120, with the first top scarfed section 152 extending from an inner edge 156 to the forward edge 128 of the elongated portion 147 of the top side 120 and the second top scarfed section 254 extending from an inner edge 158 to the aft edge 130 of the elongated portion 147 of the top side 120. Similarly, as shown in FIG. 4, first and second bottom scarfed sections 160, 162 may be defined along the inner surface of the bottom side 122, with the first bottom scarfed section 160 extending from an inner edge 164 to the forward edge 132 of the bottom side 122 and the second top scarfed section 162 extending from an inner edge (not shown) to the aft edge 134 of the bottom side 122. In such an embodiment, each scarfed section 152, 154, 160, 162 may be configured to taper outwardly from its inner edge 156, 158, 164 (i.e., with the height of each scarfed section 152, 154, 160, 162 increasing from its inner edge 156, 158, 164 to the respective forward or aft edges 128, 130, 132, 134 of the top and bottom sides 120, 122 of the blade insert 106).

It should be appreciated that the scarfed sections 152, 154, 160, 162 may generally be defined at any suitable chordwise location along the top and bottom sides 120, 122 of the blade insert 106. However, in several embodiments, the scarfed sections 152, 154, 160, 162 may be aligned with the spar caps 142, 144 of the blade insert 106. For example, as shown in FIG. 4, the top scarfed sections 152, 154 are generally aligned with the top spar cap 142 while the bottom scarfed sections 160, 162 are generally aligned with the bottom spar cap 144. In such an embodiment, a width 168 (FIG. 4) of each scarfed section 152, 154, 160, 162 may generally correspond to the width of the spar caps 142, 144. Alternatively, the width 168 of each scarfed section 152, 154, 160, 162 may be greater or less than the width of the spar caps 142, 144.

Moreover, a portion of the shell(s) forming the blade insert 106 may be recessed relative to the forward and aft edges 128, 130, 132, 134 of the top and bottom sides 120, 122. For example, as shown in FIG. 4, only an inner layer of the top side shell (e.g., one or more layers of laminate composite) may extend to the forward and aft edges 128, 130 of the top side 120 while only an outer layer of the bottom side shell (e.g., one or more layers of laminate composite) may extend to the forward and aft edges 132, 134 of the bottom side 122, thereby defining top and bottom flanges 172, 174 extending across portions of such edges 128, 130, 132, 134. As will be described below, the top and bottom flanges 172, 174 may facilitate securing the blade insert 106 between the first and second blade segments 102, 104. The outer layers of the shell(s) (e.g., one or more outer layers of laminate composite and/or one or more layers of core material 42) may then be positioned over the flanges 172, 174 to create a smooth surface along the inner and outer surfaces of the rotor blade assembly 100.

Referring now to FIG. 6, a perspective view of a suitable segment configuration for attaching each blade segment 102, 104 to the blade insert 106 shown in FIGS. 4 and 5 is illustrated in accordance with aspects of the present subject matter. Specifically, FIG. 6 illustrates a perspective view of the joint end 110 of the first blade segment 102. However, it should be appreciated that the joint end 112 of the second blade segment 104 may be configured the same as or similar to the joint end 110 shown in FIG. 6.

As shown, the blade segment 102 may be modified to include scarfed sections 175, 176 configured to be aligned with the scarfed sections 152, 160 of the blade insert 106. Specifically, in the illustrated embodiment, the blade segment 102 includes a top scarfed section 175 defined along the outer surface of its pressure side 30 that is configured to be aligned with top scarfed section 152 defined at the forward edge 128 of the top side 120 of the blade insert 106. Similarly, the blade segment 102 includes a bottom scarfed section 176 defined along the inner surface of its suction side 32 that is configured to be aligned with the bottom scarfed section 160 defined at the forward edge 132 of the bottom side 122 of the blade insert 106. As will be described below, a scarfed connector(s) may be positioned across each aligned pair of scarfed sections 152, 160, 175, 176 to provide a means for securing the blade segment 102 to the blade insert 106.

Additionally, similar to the blade insert 106, the blade segment 102 may include an offset edge(s) 177 at its joint end 110 that is offset from the edge(s) of the opposing side of the blade segment 102 by a given spanwise distance 178. Specifically, in the illustrated embodiment, a portion of the shell forming the pressure side 30 may be removed between the joint end 110 of the blade segment 102 and a front edge of the top scarfed section 175, thereby defining the offset edge 177. As will be described below, this removed portion of the shell may form part of the access window(s) 140, 141 defined between the blade segment 102 and the blade insert 106 when such components are positioned adjacent to one another.

Moreover, as shown in FIG. 6, a portion of the shell(s) forming the pressure and suction sides 30, 32 of the blade segment 102 may be recessed relative to the joint end 110 of the blade segment 102. For example, similar to the blade insert 106, only an inner layer of the shell(s) (e.g., one or more layers of laminate composite) may be configured to extend to the joint end 110 of the blade segment 102, thereby defining top and bottom flanges 179, 180 around portions of the perimeter of the joint end 110.

Figure 7:
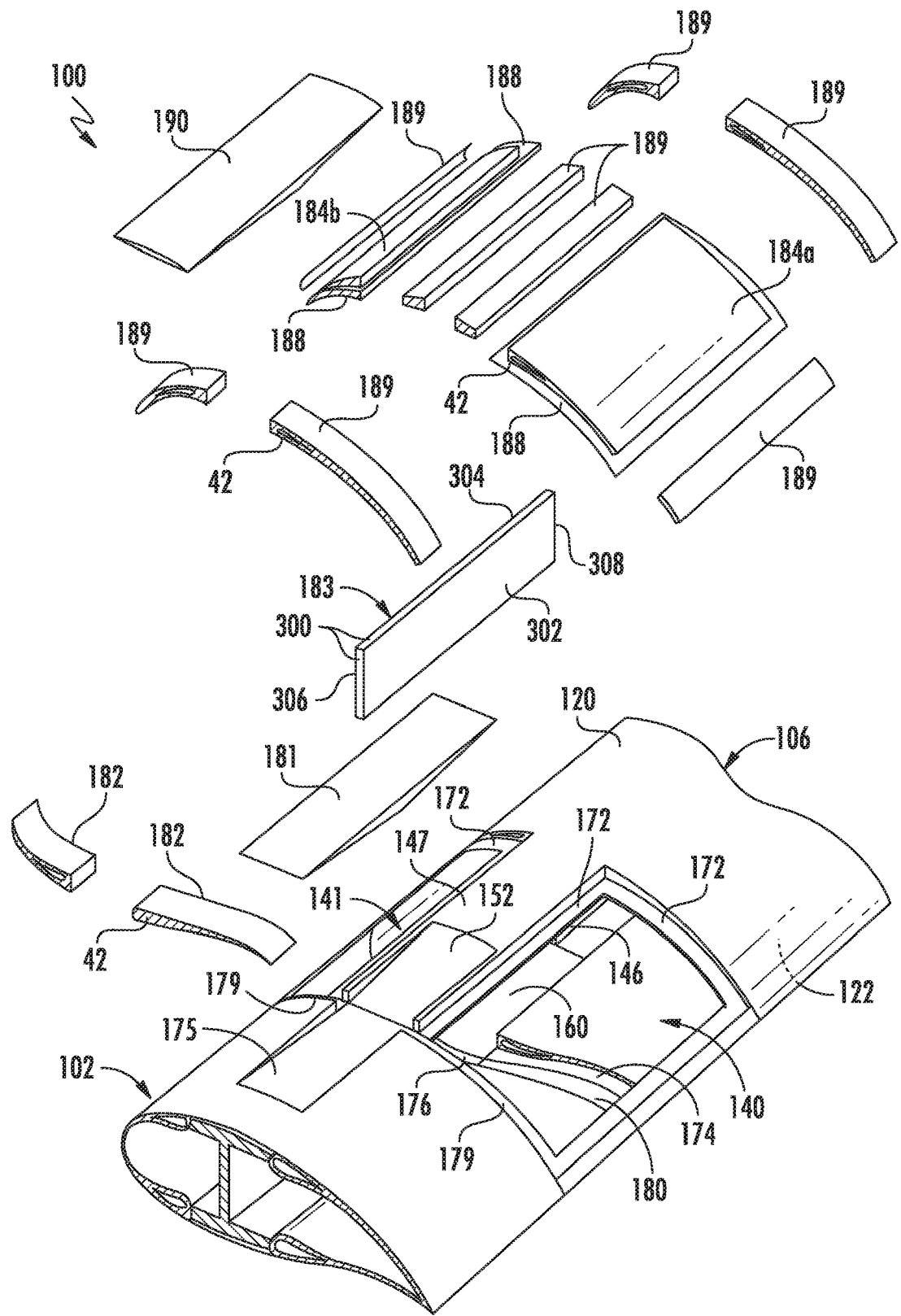
FIG. 7 illustrates an exploded view of a portion of one embodiment of the disclosed rotor blade assembly, particularly illustrating the rotor blade assembly including the blade insert shown in FIGS. 4 and 5 and the blade segment shown in FIG. 6.
Figure 8:
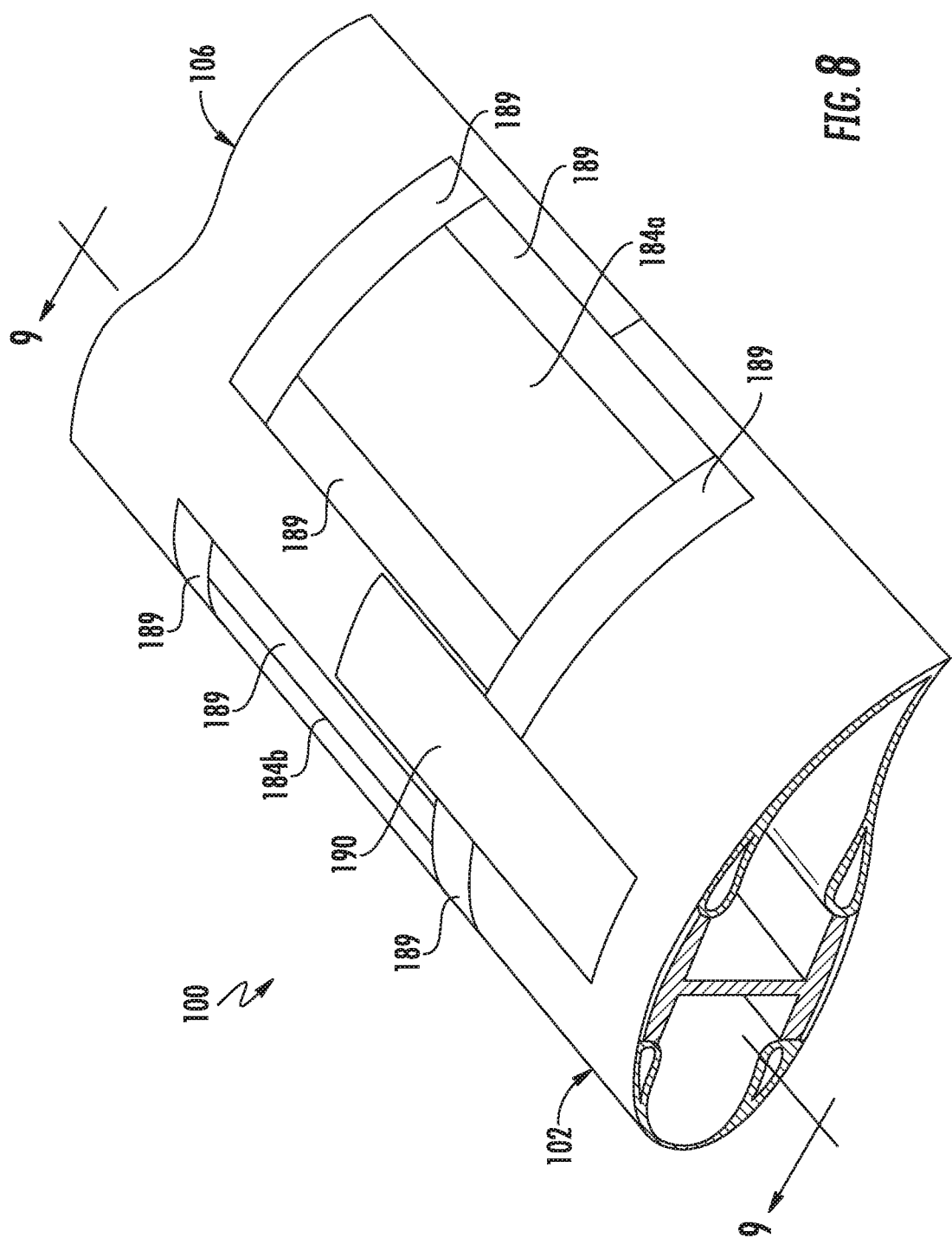
FIG. 8 illustrates a perspective, assembled view of the components shown in FIG. 7.
Figure 9:
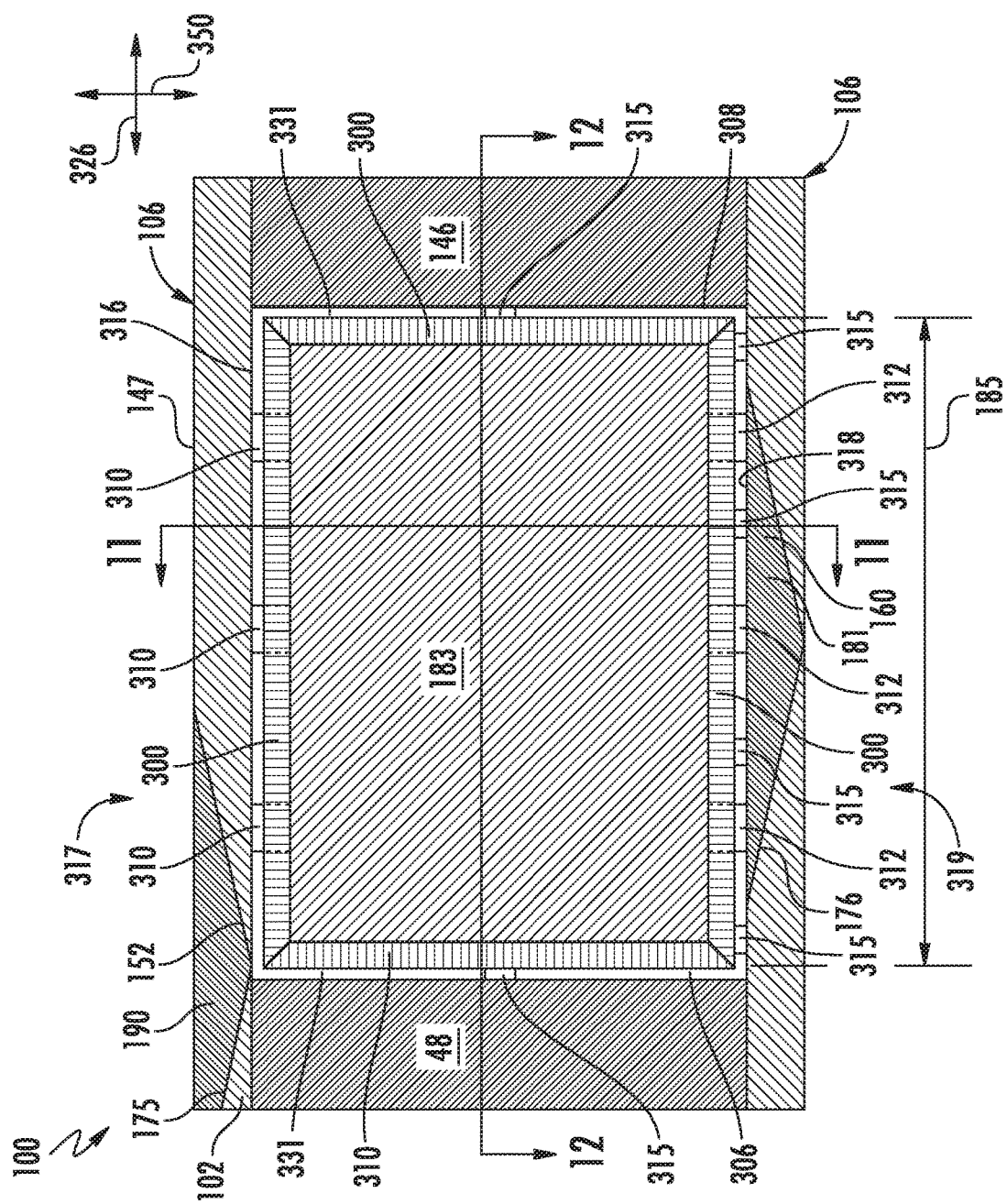
FIG. 9 illustrates a cross-sectional view of a portion of the rotor blade assembly shown in FIG. 8 taken about line 9-9.

Referring now to FIGS. 7-9, several assembly views of the blade insert 106 shown in FIGS. 4 and 5 and the blade segment 102 shown in FIG. 6 are illustrated in accordance with aspects of the present subject matter. Specifically, FIG. 7 illustrates a perspective view of the blade insert 106 and the blade segment 102 positioned end-to-end, with suitable components for securing the blade insert 106 to the blade segment 102 being exploded outward. FIG. 8 illustrates a perspective, assembled view of the various components shown in FIG. 7 and FIG. 9 illustrates a cross-sectional view of the assembly shown in FIG. 8 taken about line 9-9.

As shown in FIG. 7, when the blade segment 102 and the blade insert 106 are positioned end-to-end, separate access windows (e.g., a first access window 140 and a second access window 141) may be defined between such components along either side of the elongated portion 147 of the top side 120 of the blade insert 106. Such access windows 140, 141 may generally allow a service worker(s) to access the interior of the rotor blade assembly 100, thereby facilitating the installation of many of the assembly components shown in FIG. 7. For example, in one embodiment, a bottom scarfed connector 181, bottom shell inserts 182 and a shear web insert 183 may be installed within the rotor blade assembly 100 via the access provided by the access windows 140, 141. Thereafter, the access windows 140, 141 may be covered by suitable window covers 184a, 184b to allow the assembly process to be finalized.

As indicated above, when the blade insert 106 and the blade segment 102 are positioned end-to-end, the bottom scarfed section 160 at the forward end 116 of the blade insert 106 may be configured to be aligned with the bottom scarfed section 176 of the blade segment 102. Specifically, as shown in FIG. 9, the aligned bottom scarfed sections 160, 176 may be configured to abut one another when the blade insert 106 and blade segment 102 are positioned together. In such an embodiment, a bottom scarfed connector 181 may be positioned across the bottom scarfed sections 160, 176 in order to facilitate coupling the blade insert 106 to the blade segment 102. Specifically, as shown in FIGS. 7 and 9, the bottom scarfed connector 181 may generally define a tapered profile corresponding to the tapered profiles defined by the bottom scarfed sections 160, 176. Thus, as shown in FIG. 9, the bottom scarfed connector 181 may be configured to extend across the interface defined between the blade segment 102 and the blade insert 106 so as to fill the open area defined by the bottom scarfed sections 160, 176.

In several embodiments, the bottom scarfed connector 181 may comprise a pre-fabricated component configured to be separately installed within the rotor blade assembly 100 (via one of the access windows 140, 141) and secured across the aligned bottom scarfed sections 160, 176, such as by securing the scarfed connector 181 within the bottom scarfed sections 160, 176 using suitable bonding pastes, such as bonding pastes, and/or mechanical fasteners (e.g., bolts, screws, pins, rivets, brackets and/or the like). Alternatively, the bottom scarfed connector 181 may be formed or otherwise built-up within the aligned bottom scarfed sections 160, 176. For instance, in one embodiment, the scarfed connector 181 may be formed using a wet lay-up process, wherein a plurality of plies (including a reinforcement material such as glass or carbon fibers) are positioned across and/or within the bottom scarfed sections 160, 176 and a resin or other suitable matrix material is rolled over or otherwise applied to the surface of the plies and allowed to cure.

In addition to the bottom scarfed sections 160, 176, the bottom flanges 174, 180 of the blade insert 106 and the blade segment 102 may also be configured to abut one another when the blade insert 106 is positioned end-to-end with the blade segment 102. As such, suitable bottom shell inserts 182 may be secured across the bottom flanges 174, 180 along either side of the bottom scarfed connector 181 to further secure the blade insert 106 and the blade segment 102 to one another Specifically, the bottom shell inserts 182 may generally configured to extend across the interface defined between the blade segment 102 and the blade insert 106 so as to fill the open area defined by bottom flanges 174, 180. For example, as shown in FIG. 7, the bottom shell inserts 182 may generally define a profile matching the profile of the corresponding portions of the shells for the blade insert 106 and the blade segment 102 and may also be formed from the same material (e.g., one or more layers of laminate component and/or one or more layers of core material 44). It should be appreciated that, similar to the bottom scarfed connector 181, the bottom shell inserts 182 may be pre-fabricated components or may be formed or otherwise built-up within the open area defined by the bottom flanges 174, 180.

Figure 11:
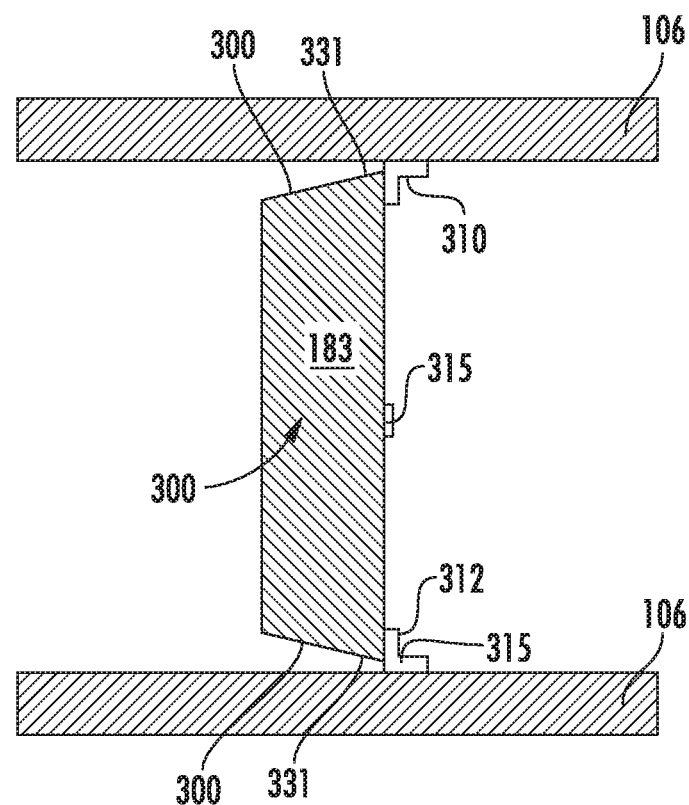
FIG. 11 illustrates a side view of the rotor blade assembly shown in FIG. 9 taken about line 11-11.

As indicated above, a shear web insert 183 may also be installed within the rotor blade assembly 100 via one of the access windows 140, 141. As shown in FIG. 7, the shear web insert 183 may generally include a first side face 302 and a second side face 304 extending between first and second ends 306, 308. In general, the shear web insert 183 may be configured to extend spanwise between the terminating ends of the shear webs 48, 146 for the blade segment 102 and the blade insert 106. Specifically, as shown in FIG. 9, the shear web insert 183 may be configured to a define a length 185 between its first and second ends 306, 308 generally corresponding to the gap defined between the end of the first shear web 48 for the blade segment 102 and the end of the second shear web 146 for the blade insert 106. As such, the shear web insert 183 may be inserted within the rotor blade assembly 100 via one of the access windows 140, 141 and subsequently secured between the shear webs 48, 146. For instance, as will be described below, one or more positioning device segments 310, 312, 315 and/or one or more connecting devices (FIG. 9) may be coupled along the inner surfaces 316, 318 of the first side 317 and second side 319 of the rotor blade assembly 100 (e.g., the inner surface 316 (FIG. 11) defined along the pressure side or first side 317 of the assembly 100 and the inner surface 318 (FIG. 11) defined along the suction side or second side 319 of the assembly 100) to assist in installing the shear web insert 183 between the shear webs 48, 146.

After installing such components within the rotor blade assembly 100, suitable window covers 184a, 184b may then installed between the blade insert 106 and the blade segment 106 so as to cover at least a portion of each access window 140, 141. For example, as shown in FIG. 7, a first window cover 184a may be configured to extend across and/or cover at least a portion of the first access window 140. Similarly, a second window cover 184b may be configured to extend across and/or cover at least a portion of the second access window 141. As shown in FIG. 7, the window covers 184a, 184b may generally have a similar construction to that of the shells used to form the blade insert 106 and the blade segment 102. For example, the window covers 184a, 184b may be formed from a layered construction, including one or more layers laminate material and one or more layers of core material 42.

Additionally, similar to the blade insert 106 and the blade segment 102, a portion of the shell(s) forming the window covers 184a, 184b may be recessed or offset, thereby defining cover flanges 188 around the edges of the window covers 184a, 184b. Thus, when each window cover 184a, 214b is installed across its corresponding access window 140, 141, the cover flanges 188 may be configured to abut against the top flanges 172, 179 of the blade insert 106 and the blade segment 102. Thereafter, a suitable top shell insert 189 may be secured across each interface defined between the blade segment 212 and the window covers 184a, 184b and across each interface defined between the blade insert 106 and the window covers 184a, 184b so as to fill the open area defined by the top and cover flanges 172, 179, 188. For example, as shown in FIG. 7, the top shell inserts 189 may generally define a profile matching the profile of the corresponding portions of the shells for the blade insert 106 and the blade segment 212 and may also be formed from the same material (e.g., one or more layers of laminate component and/or one or more layers of core material 42).

Moreover, as shown in the illustrated embodiment, the rotor blade assembly 100 may also include a top scarfed connector 190 configured to be positioned across the aligned top scarfed sections 152, 175 of the blade insert 106 and the blade segment 102. As shown in FIG. 7, the top scarfed connector 190 may define a tapered profile corresponding to the tapered profiles defined by the top scarfed sections 151, 175. Thus, as particularly shown in FIG. 9, the top scarfed connector 190 may be configured to extend across the interface defined between the blade segment 102 and the blade insert 106 so as to fill the area defined by the aligned top scarfed sections 152, 175.

It should be appreciated that, similar to the bottom scarfed connector 181 and the bottom shell inserts 182, the top scarfed connector 190 and the tip shell inserts 189 may be pre-fabricated components or may be formed or otherwise built-up during assembly of the rotor blade assembly 100.

It should also be appreciated that, after the various components of the rotor blade assembly 100 have been assembled between the blade segment 102 and the blade insert 106, an overlaminate may be applied around the outer surface of the assembly 100 to ensure a smooth aerodynamic transition between the blade segment 102 and the blade insert 106. For example, the overlaminate may be applied using a wet lay-up process, wherein one or more plies (including a reinforcement material such as glass or carbon fibers) are positioned along the outer surface and a resin or other suitable matrix material is rolled over or otherwise applied to the surface of the plies to form a smooth profile.

Moreover, it should be appreciated that, although the blade insert 106 was described with reference to FIGS. 7-9 as simply being secured to one of the blade segments (e.g., the first blade segment 102), the same or a similar methodology, as well as the same or similar components, may be used to secure the blade insert 106 to the other blade segment (e.g., the second blade segment 104). For example, a bottom scarfed connector 181, bottom shell inserts 182, a shear web insert 183, window cover(s) 184*a*, 184*b*, top shell inserts 189 and a top scarfed connector 190 may be installed between the aft end 118 of the blade insert 106 and the joint end 112 of the second blade segment 104 to allow such components to be secured to another in the same manner that the blade insert 106 and the first blade segment 102 were secured together (e.g., as shown in FIGS. 7-9).

Further, it should be appreciated that the blade insert 106 described herein may be considered as a blade segment. Thus, one of ordinary skill in the art should appreciate that the disclosed rotor blade assembly 100 may include one or a plurality of blade inserts 106, with each blade insert forming an individual segment of the rotor blade assembly 100.

Referring now to FIG. 10, a flow diagram of one embodiment of a method 200 for installing a shear web insert 183 between the blade insert 106 and one of the blade segments 102, 104 will be described in accordance with aspects of the present subject matter. In general, due to the configuration of the blade insert 106 (i.e., due to the elongated portions 147), the shear web insert 183 must be installed horizontally. Specifically, the shear web 183 must be inserted through one of the access windows 140, 141 and then inserted horizontally between the second shear web 146 for the blade insert 106 and the first shear web 48 for the corresponding blade segment 102, 104.

It should be appreciated that the method 200 will generally be described herein with reference to installing a shear web insert 183 between the blade insert 106 and the first blade segment 102. However, the same methodology may also be utilized for installing a shear web insert 183 between the blade insert 106 and the second blade segment 102 or for assembling modular blades having a first shear web 48 and a second shear web 146. For purposes of describing the disclosed method 200, the shear web 48 of the first blade segment 102 will be referred to as a "first shear web 48" and the shear web 146 of the blade insert 106 will be described as a "second shear web 146." Thus, a shear web insert 183 can be provided at both ends of the blade insert 106, i.e. at both joints of the blade insert 106. It should also be appreciated that, although method elements are presented in a particular order, the elements may generally be performed in any suitable order consistent with the disclosure provided herein.

As shown in FIG. 10, a method 200 for connecting a blade segment 102 and blade insert 106 of a rotor blade assembly 100 at a shear web joint is disclosed, the blade segment 102 including a first shear web 48 and the blade insert 106 including a second shear web 146. The method steps 202 through 204 include dry-fitting a shear web insert 183 in a rotor blade assembly 100 to establish a perimeter gap 331 at an angled perimeter interface 300 between the shear web insert 183 and the rotor blade assembly 100, the angled perimeter interface 300 positioned between the shear web insert 183 and at least one adjacent surface of a first shear web 48, a second shear web 146, a first side of the rotor blade assembly 317, and a second side of the rotor blade assembly 319. Then injecting a bonding paste 328 into the perimeter gap 331.

Additional method steps can include coupling at least one first connecting device (342) across a portion of the perimeter gap 331, the at least one first connecting device 342 disposed partially on the first side face 302 of at least one of the first shear web 48 and the second shear web 146, and then coupling at least one second connecting device 344 across a portion of the perimeter gap 331, the at least one second connecting device 344 disposed partially on the opposing second side face 304 of at least one of the first shear web 48 and the second shear web 146.

Also, the method can include coupling at least one first and second positioning device segments 310, 312 along an inner surface 316, 318 of at least one of a first side 317 or a second side 319 of the rotor blade assembly 100. Then placing a plurality of spacers 315 along at least one of a bottom face 332, a first end 306, or a second end 308 of a shear web insert 183, the plurality of spacers 315 aligned with a first side face 302 of the shear web insert 183. Then positioning the shear web insert 183 between the first and second shear webs 48, 146 until the first side face 302 of the shear web insert 183 engages the first and second positioning device segments 310, 312. The spacers 315 will thereby define a perimeter gap 331 around the shear web insert 183 angled perimeter interface 300. Then injecting an bonding paste into the perimeter gap 331 around the shear web insert 183 angled perimeter interface 300.

In general, the positioning device segments 310, 312 may have any suitable configuration that allows such devices 310, 312 to serve as mechanical stops for positioning the shear web insert 183 between the first and second shear webs 48, 146. As shown, in several embodiments, the positioning device segments 310, 312 may each define an "L" shaped structural segment having a horizontal portion 322 coupled to the inner surface 316, 318 of the assembly 100 (e.g., using a suitable bonding paste(s) or mechanical fastener(s)) and a vertical portion 324 extending generally perpendicularly from the horizontal portion 322. In such an embodiment, the vertical portion 324 of each positioning device segment 310, 312 may generally be configured to serve as a mechanical stop for the shear web insert 183 as it is being inserted between the first and second shear webs 48, 146. In other embodiments, the positioning device segments 310, 312 may have any other suitable configuration that allows such devices to function as described herein.

Additionally, as shown in FIGS. 9-13, the first and second positioning device segments 310, 312 may generally be configured to be aligned with one another in the horizontal or chordwise direction of the rotor blade assembly 100 (i.e., indicated by arrow 320). Specifically, in several embodiments, the vertical portions 324 of the positioning device segments 310, 312 may be aligned at a first chordwise position (indicated by the line 326 in FIG. 13) that generally corresponds to the location at which the first side face 302 of the shear web insert 183 is to be positioned when the insert 183 is properly installed between the first and second shear webs 48, 146.

Moreover, in several embodiments, the positioning device segments 310, 312 may be separately placed in the spanwise direction (indicated by arrow 326 in FIG. 13) along all or a substantial portion of the length 185 of the shear web insert 183. For example, as shown in FIG. 9, the positioning device segments 310, 312 can be separately placed along a length generally corresponding to the length 185 of the shear web insert 183. Alternatively, the positioning device segments 310, 312 may be separately placed to define a length that is shorter than the overall length 185 of the shear web insert 183. In such an embodiment, a plurality of positioning device segments 310, 312 may, for example, be spaced apart along the length 185 of the shear web insert 183.

It should be appreciated that, in addition to acting as a mechanical stop, the positioning device segments 310, 312 may also be used as a means for transferring loads through the rotor blade assembly 100. For example, by coupling one or more positioning device segments 310, 312 along the length 185 of the shear web insert 183, loads may be transferred between the shear web insert 183 and the body 114 of the blade insert 106 and/or the body 28 of the blade segment 102.

Figure 14:
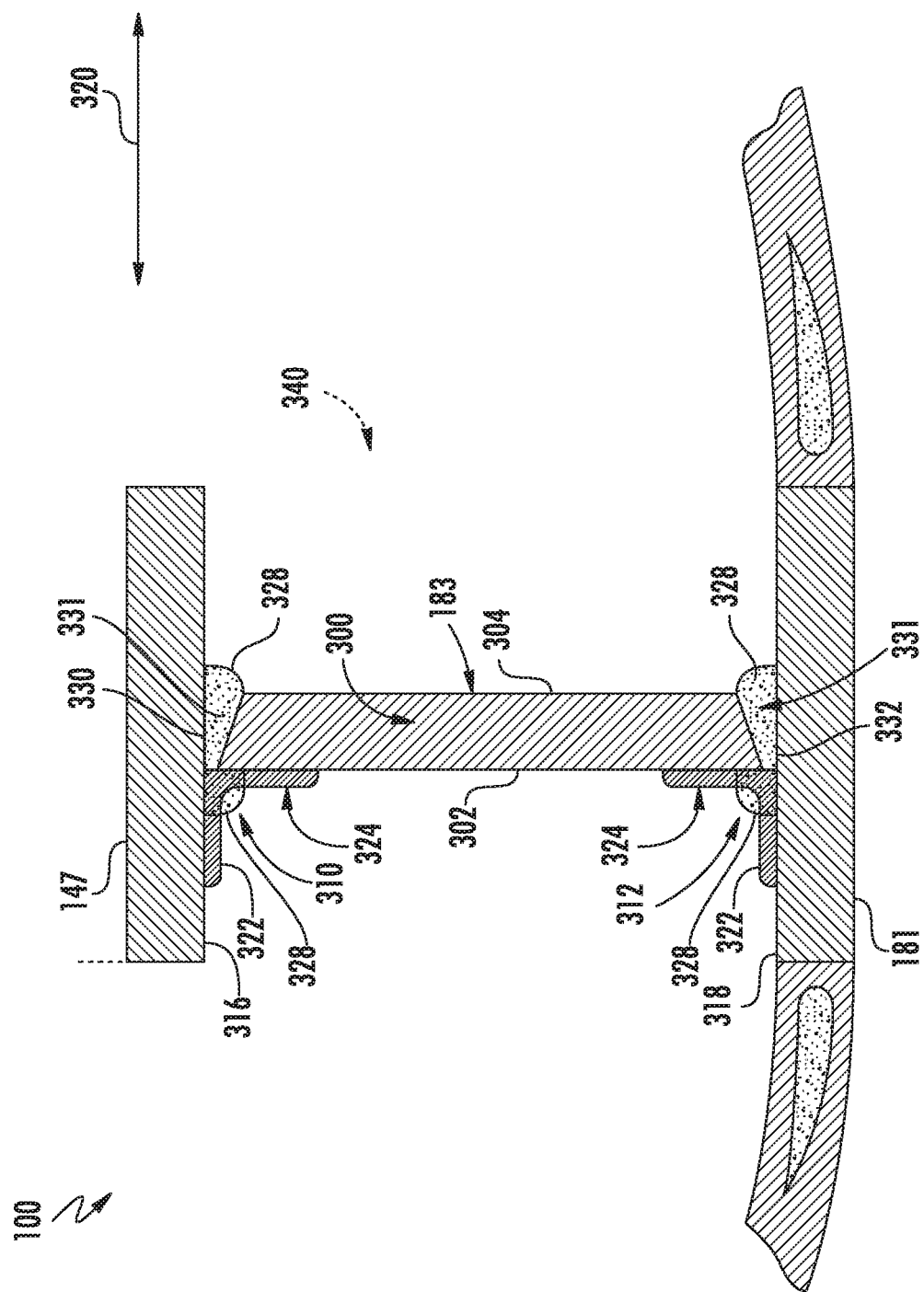
FIG. 14 illustrates a side view of a shear web insert installed against positioning devices.

Referring back to FIG. 10, at (208), the method 200 includes injecting an bonding paste 328 into the perimeter gap 331 around the shear web insert 182 angled perimeter interface 300 of the rotor blade assembly 100 at a location adjacent to the positioning device segment(s) 310, 312. Bonding paste injection can be performed by an injection device 366 such as a 'shoe' or injector nozzle. As the bonding paste 328 is injected, a volume of bonding paste 328 may be injected in a manner so that the bonding paste 328 extends from the vertical portions 324 of the positioning device segments 310, 412 outward along the inner surfaces 316, 318. In injecting the bonding paste 328 along the inner surfaces 316, 318, it may be desirable to provide a sufficient amount of bonding paste 328 so that a squeeze out, or spill out occurs (e.g., as shown in FIG. 14) at the interface between the positioning device segments 310, 312 and the shear web insert 183 and the interface between the inner surfaces 316, 318 and the shear web insert 183 when the insert 183 is positioned between the first and second shear webs 48, 146. As such, the bonding paste 328 may be uniformly spread between the shear web insert 183 and the positioning device segments 310, 312 and between the shear web insert 183 and the inner surfaces 316, 318 of the rotor blade assembly 100.

It should be appreciated that any suitable bonding paste 328 known in the art may be utilized for securing the shear web insert 183 between the first and second shear webs 48, 146. In addition, it should be appreciated that the bonding paste 328 may be injected along the inner surfaces 316, 318 of the rotor blade assembly 100 so as to form any suitable cross-sectional shape.

Referring back to FIG. 10, at 206, the method 200 includes positioning the shear web insert 183 between the first and second shear webs 48, 146. Specifically, in several embodiments, the shear web insert 183 may be inserted between the first and second shear webs 48, 146 until the first side face 320 of the insert 183 engages the positioning device segments 310, 312, thereby indicating that the shear web insert 183 is properly positioned within the rotor blade assembly 100. As used herein, the shear web insert 183 may be engaged with the positioning device segments 310, 312 by contacting the devices 310, 312 directly or by contacting the devices 310, 312 indirectly (e.g., via the bonding paste 328). For instance, as shown in FIG. 14, the shear web insert 183 may be considered to be engaged with the positioning device segments 310, 312 even though a layer of bonding paste 328 is present between the first side face 302 of the shear web insert 183 and the vertical portion 324 of each positioning device segment 310, 312.

Figure 12:
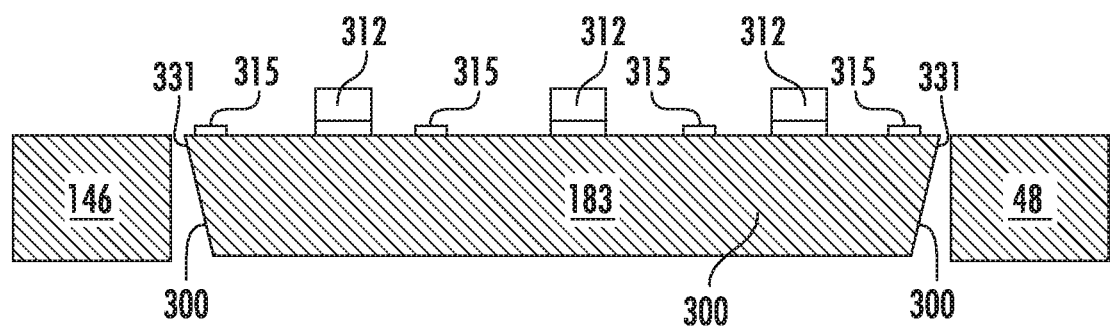
FIG. 12 illustrates a top view of the rotor blade assembly shown in FIG. 9 taken about line 12-12.
Figure 13:
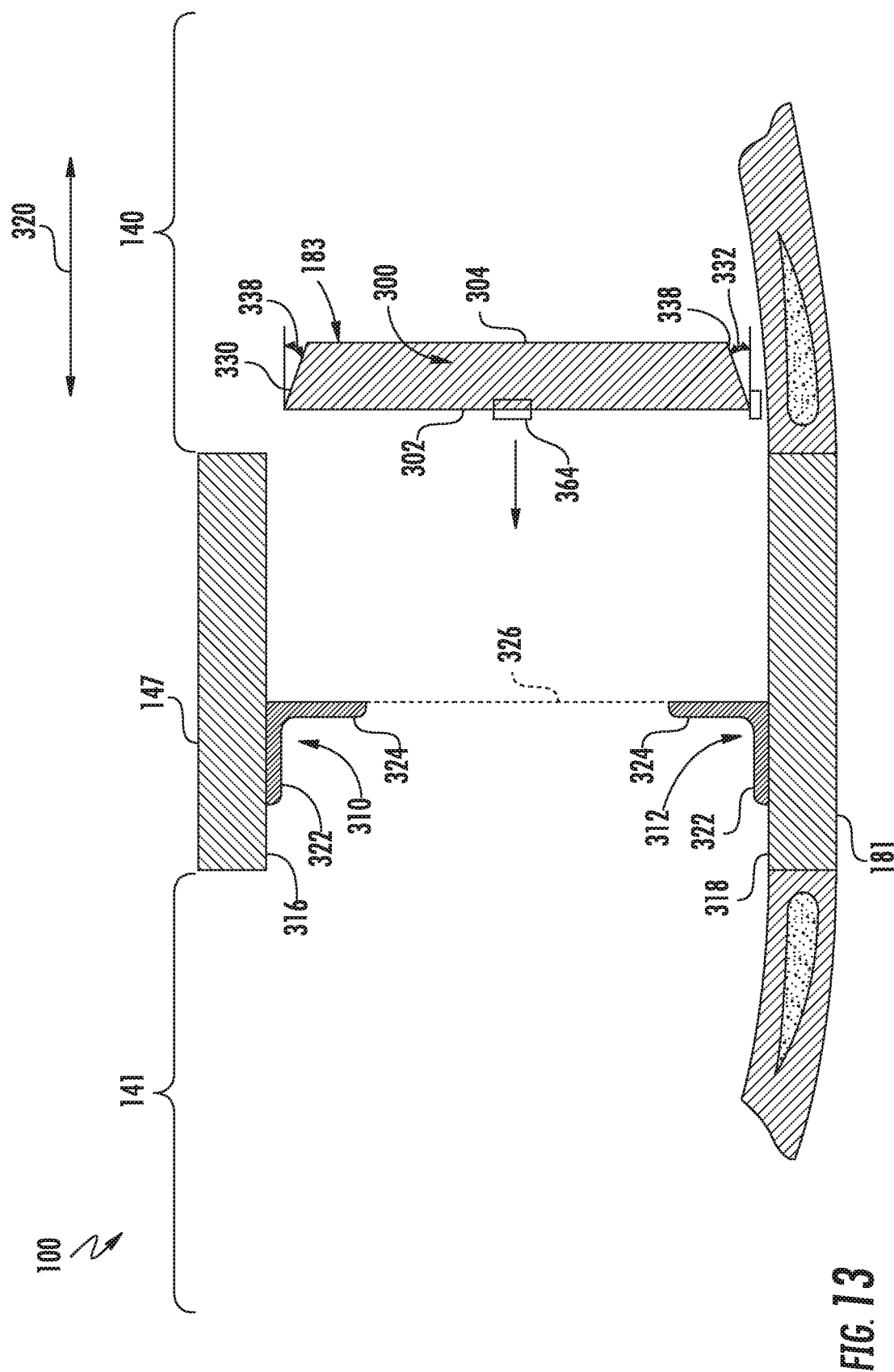
FIG. 13 illustrates a side view of the a shear web insert being installed horizontally in a rotor blade assembly.

As shown in FIG. 14, when the shear web insert 183 is pushed horizontally into engagement with the positioning device segments 310, 312, the bonding paste 328 may be squeezed out, or spill out, from between the shear web insert 183, the inner surfaces 316, 318 and the positioning device segments 310, 312, thereby providing an indication that the bonding paste 328 has spread out between such components. In several embodiments, a top face 330 and/or a bottom face 332 of the shear web insert 182 may be shaped or otherwise configured to assist in allowing a proper squeeze out of the bonding paste 183. For example, as particularly shown in the close up view of FIG. 14, the top and bottom faces 330, 332 may be angled relative to the inner surfaces 316, 318 of the rotor blade assembly 100. Specifically, the top and bottom faces 330, 332 and the first and second ends 306, 308 may include a perimeter gap 331 positioned around the angled perimeter interface 300 and may be angled away from the positioning device segments 310, 312 so that a first gap 334 defined between the top and bottom faces 330, 332 and the inner surfaces 316, 318 at the first side face 302 of the shear web insert 183 is smaller than a second gap 336 defined between the top and bottom faces 330, 332 and the inner surfaces 316, 318 at the second side face 304 of the shear web insert 183. For instance, in several embodiments, the top and bottom faces 330, 332 may be configured to define an angle 338 relative to the inner surfaces 316, 318 that ranges from about 5 degrees to about 50 degrees, such as from about 10 degrees to about 45 degrees or from about 10 degrees to about 25 degrees and any other subranges therebetween. By configuring the top and bottom faces 330, 332 as shown in FIGS. 12 and 13, the bonding paste 328 may advantageously spread between the shear web insert 183 and the inner surfaces/positioning device segments 316, 318, 310, 312 when the shear web insert 182 is properly positioned between the first and second shear webs 48, 146.

It should be appreciated that the gaps 334, 336 defined between the shear web insert 183 and the inner surfaces 316, 318 may generally correspond to any suitable distance. However, in several embodiments, the first gap 334 may generally range from about 5 millimeters (mm) to about 50 mm, such as from about 10 mm to about 40 mm or from about 10 mm to about 30 mm and any other subranges therebetween. Similarly, in several embodiments, the second gap 336 may generally range from 0 mm to about 30 mm, such as from 0 mm to about 25 mm or from about 5 mm to about 20 mm and any other subranges therebetween.

It should also be appreciated that, after positioning the shear web insert 183 between the first and second shear webs 48, 146, the insert 183 may be clamped or otherwise secured within the rotor blade assembly 100 to allow the bonding paste 328 to cure.

The method 200 can also include coupling at least one first connecting device 342 across a portion of the perimeter gap 331 defined between the first end 306 of the shear web insert 183 and the first shear web 48, the first connecting device disposed on the second side face 304 of the shear web insert 183. Then coupling a second connecting device 344 across a portion of the perimeter gap 331 defined between the first end 306 of the shear web insert 183 and the first shear web 48, the second connecting device 344 disposed on the opposing first side face 302 of the shear web insert 183.

Figure 15:
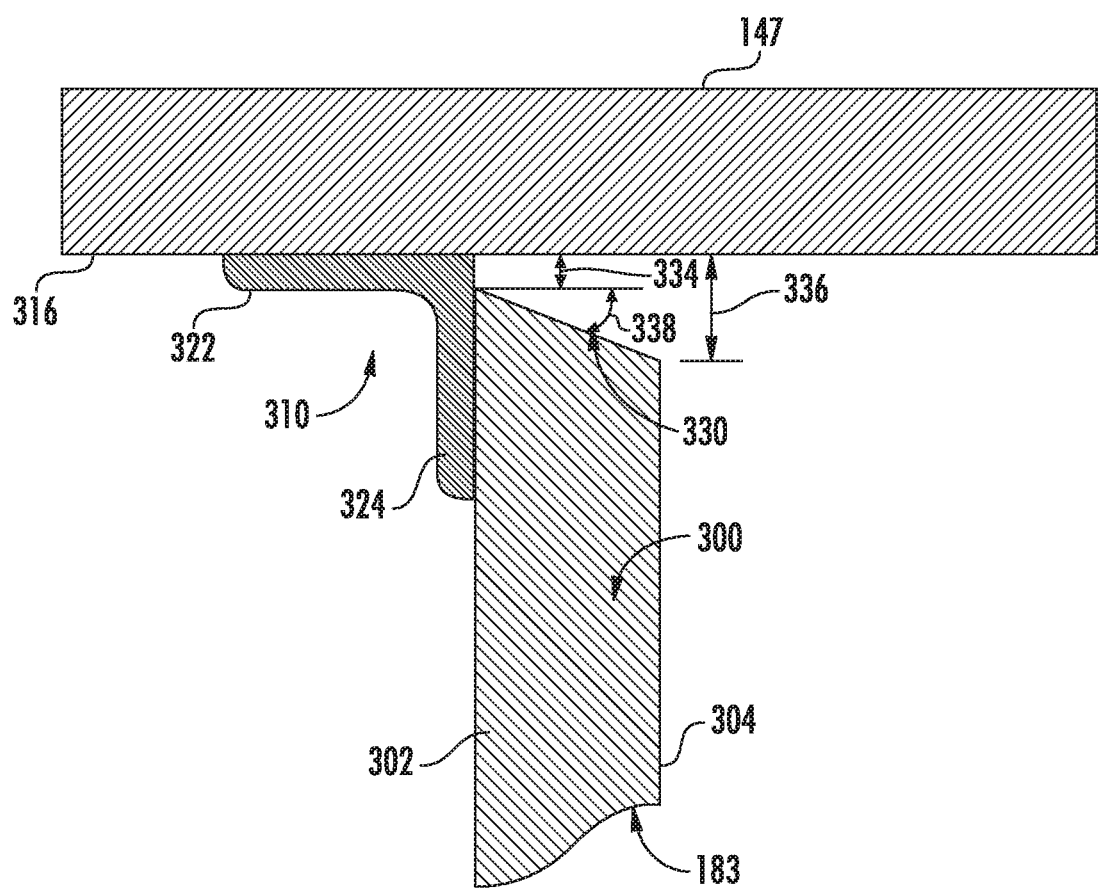
FIG. 15 illustrates details of a shear web insert having an angled perimeter interface forming the first and second gaps.

Additional steps in method 200, and illustrated in FIG. 15, can include forming a shear web insert 183 angled perimeter interface 300 such that the perimeter gap 331 comprises a first gap 334 defined between the perimeter of the first side face 302 of the shear web insert 183 and an adjacent surface, and a second gap 336 is defined between the perimeter of the second side face 304 of the shear web insert 183 and an adjacent surface.

Figure 16:
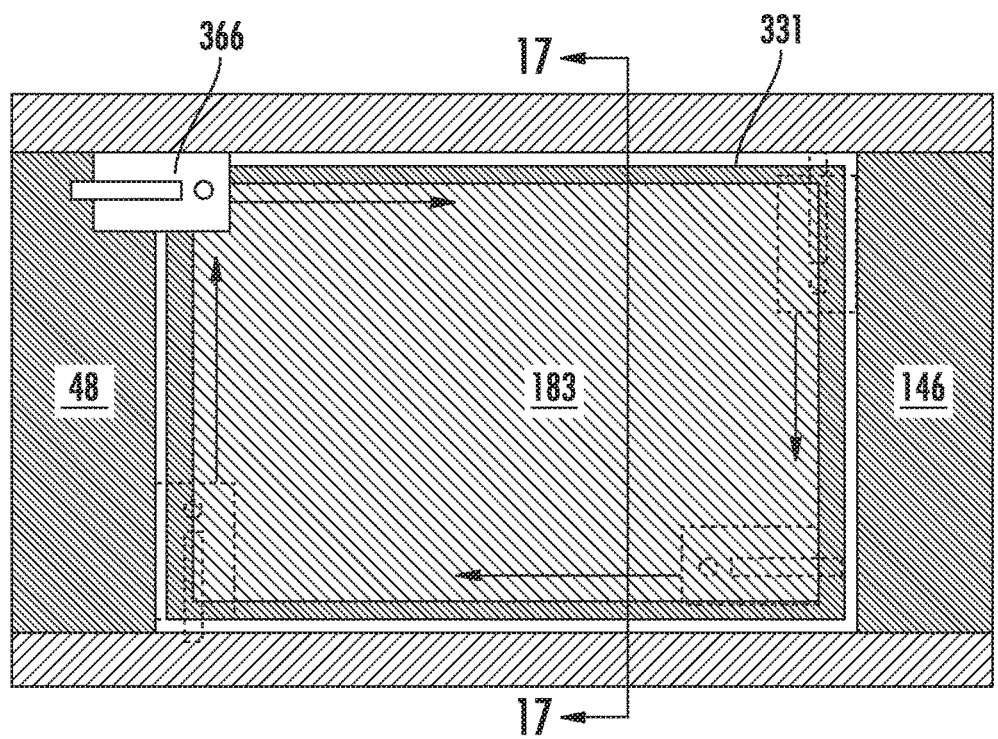
FIG. 16 illustrates a front view of an injection device location as it progresses around the angled perimeter interface of a shear web insert.
Figure 17:
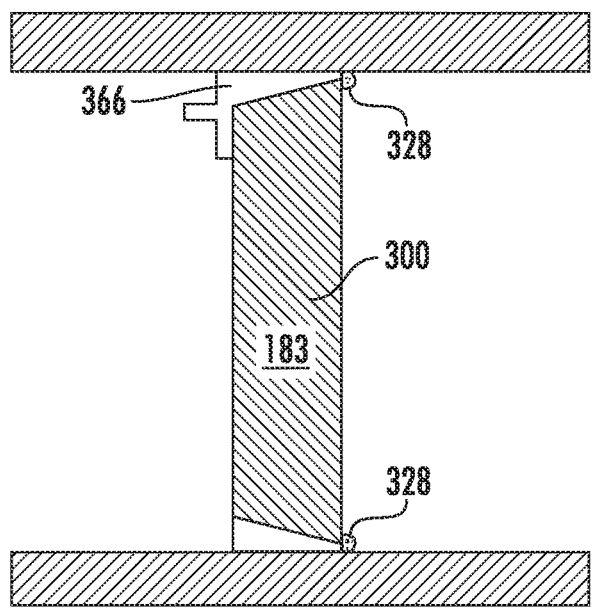
FIG. 17 illustrates a side view of an injection device location.

The perimeter gap 331 can be filled with bonding paste 328 using an injection device 366 as illustrated in FIGS. 16 and 17. The injection device 366 can be any suitable structure that can maintain contact with the perimeter gap 331 and allow continuous flow of the bonding paste, such as a 'shoe' or injector nozzle.

Figure 18:
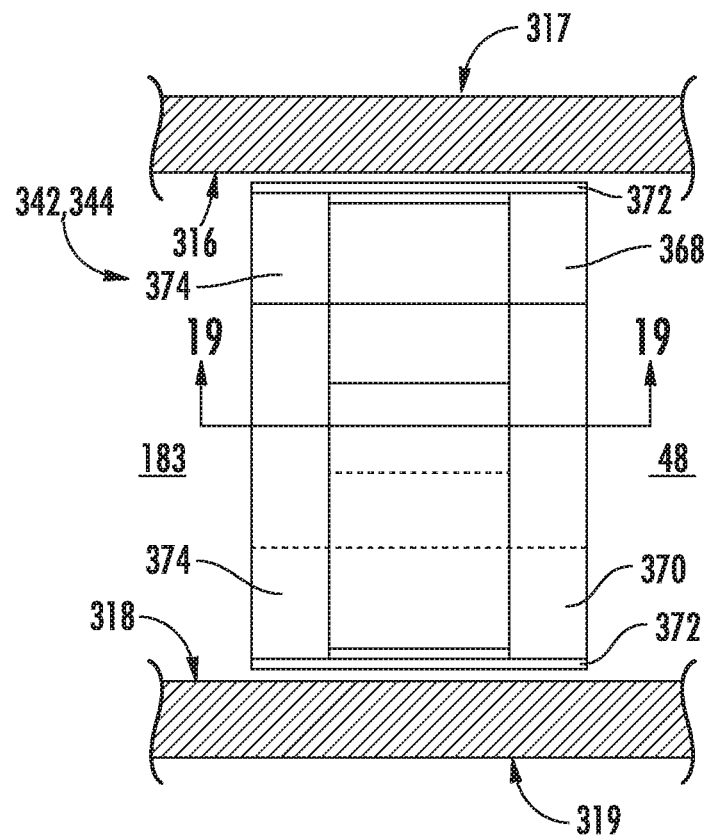
FIG. 18 illustrates a front view of a connecting device having tapered plies.
Figure 19:
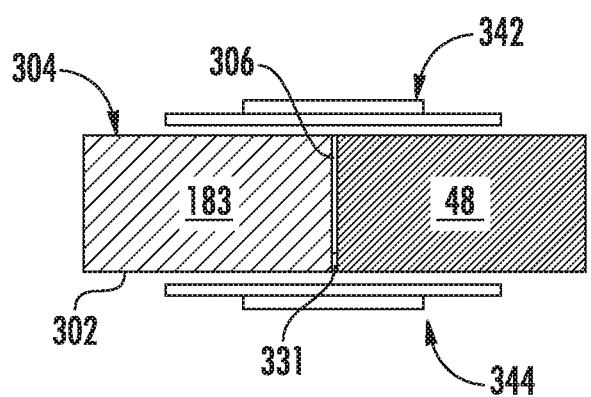
FIG. 19 illustrates a top view of first and second connecting devices in FIG. 18 taken about line 19-19.
Figure 20:
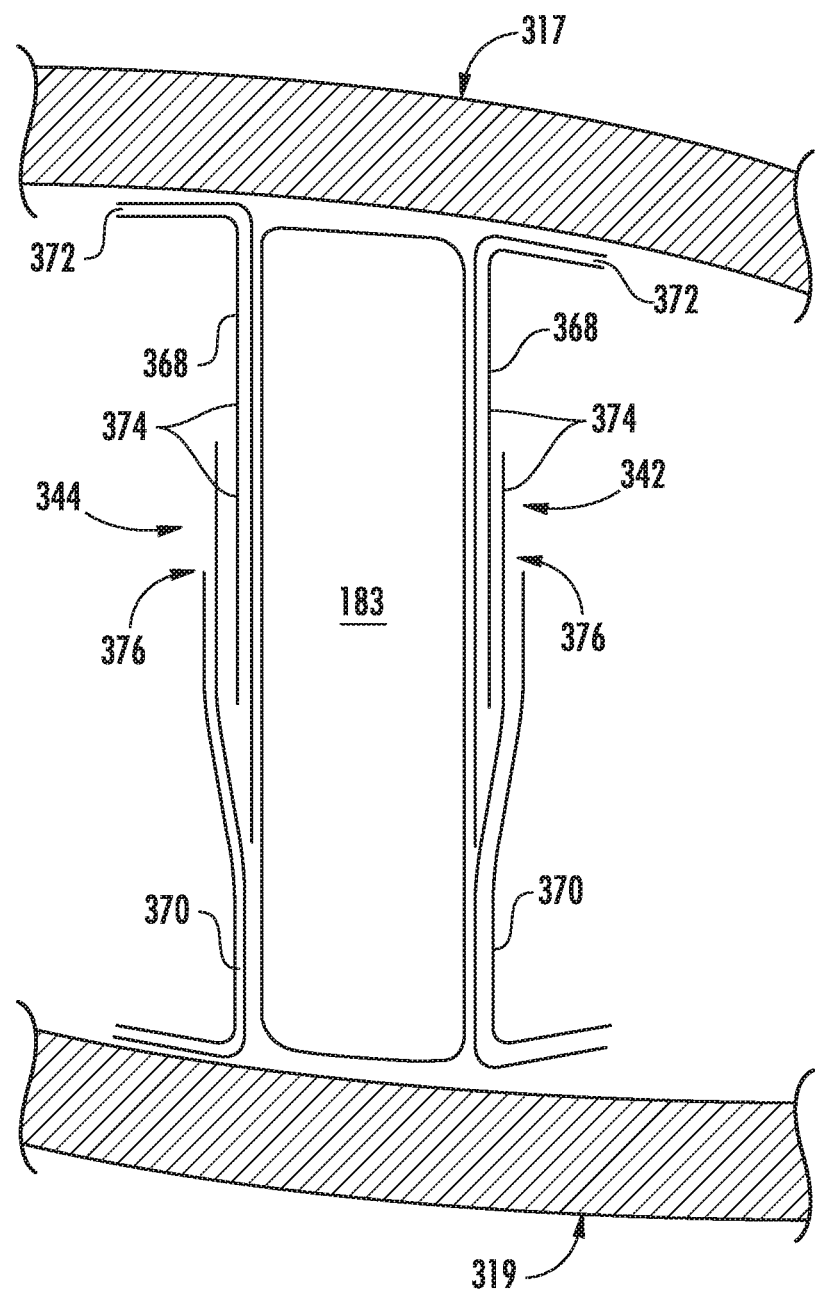
FIG. 20 illustrates a side view of first and second connecting devices installed on opposing sides of a shear web insert.

Further, as illustrated in FIGS. 18-20, each of the first and second connecting devices 342, 344 can have first and second clips 368, 370 further having horizontal and vertical portions 372, 374. The first clip 368 horizontal portion 372 can be coupled to the inner surface 316 of the first side 317 of the rotor blade assembly, and the second clip 370 horizontal portion 372 can be coupled to the inner surface 318 of the opposite second side 319 of the rotor blade assembly. The vertical portions 374 of the first and second clips 368, 370 can extend from the horizontal portions 372, in opposing directions, a sufficient distance such that the first and second clip vertical portions 374 overlap. Coupling of the horizontal portions 372 and vertical portions 374 of the first and second clips 368, 370 can be accomplished using bonding paste 328. Also, the first and second clips 368, 370 can use tapered plies 376. The first and second clips 368, 370 can be constructed to control bond thickness and can be installed during the same cure cycle as the blade insert 183.

Further, the connecting devices 342, 344 can be coupled to the inner surface(s) 316, 318 of the rotor blade assembly 100 so that the connecting devices 342, 344 are positioned adjacent to and/or otherwise engage the first and second side faces 302, 304 of the shear web insert 183 at any shear web joint. The connecting devices 342, 344 may generally be configured to serve as means for retaining the shear web insert 183 within the rotor blade assembly 100. In addition, the connecting devices 342, 344 may also be configured to serve as a means for transferring loads between the shear web insert 183 and the body 28, 114 of the rotor blade assembly 102 and/or the blade insert 106.

It should be appreciated that the connecting devices 342, 344 may generally have any suitable configuration that allows such device(s) 342, 344 to function as described herein. For instance, the connecting devices 342, 344 may be configured similarly to the positioning device segments 310, 312 described above and, thus, may include a horizontal portion 346 configured to be coupled to the inner surfaces 316, 318 (e.g., using a suitable bonding paste(s) or mechanical fastener(s)) and a vertical portion 348 extending generally perpendicularly from the horizontal portion 346 so as to define a generally "C" shaped structure when the vertical portions 374 of the first and second clips 368, 370 overlap. However, in other embodiments, the connecting devices 342, 344 may have any other suitable configuration.

It should be appreciated by those of ordinary skill in the art that the specific views shown in the figures simply illustrate one implementation of the method 200 described herein. It should also be appreciated that, although the shear web insert 183 is described herein as a single component, the insert 183 may be formed from multiple shear web segments coupled to one another within the rotor blade assembly 100. Specifically, embodiments including a multi-piece shear web insert 183 may be advantageous when sufficient access to the interior of the rotor blade assembly 100 is not available via the access windows 140, 141.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for connecting and repairing a shear web, the method comprising:
    dry-fitting a shear web insert in a rotor blade assembly to establish a perimeter gap at an angled perimeter interface between the shear web insert and the rotor blade assembly, the shear web insert defining a first side face and an opposing, second side face, the angled perimeter interface positioned between the shear web insert and at least one adjacent surface comprising a first shear web, a second shear web, a first side of the rotor blade assembly, and a second side of the rotor blade assembly;
    forming the angled perimeter interface such that a first gap is defined between the first side face of the shear web insert and the at least one adjacent surface, and a second gap is defined between the second side face of the shear web insert and the at least one adjacent surface; and
    injecting a bonding paste into the perimeter gap.

2. The method of claim 1, further comprising;
    coupling at least one first connecting device across a portion of the perimeter gap, the at least one first connecting device disposed partially on a first side face of at least one of the first shear web and the second shear web; and,
    coupling at least one second connecting device across a portion of the perimeter gap, the at least one second connecting device disposed partially on an opposing, second side face of at least one of the first shear web and the second shear web.

3. The method of claim 2, wherein each of the at least one first and second connecting devices comprises at least one pre-fabricated clip further comprising horizontal and vertical portions, the at least one pre-fabricated clip horizontal portions coupled to at least one of the inner surface of the first side of the rotor blade assembly and the inner surface of the opposite second side of the rotor blade assembly.

4. The method of claim 3, wherein the vertical portions of at least two pre-fabricated clips extend from the respective horizontal portions in opposing directions a sufficient distance to couple with an opposing vertical portion.

5. The method of claim 1, further comprising;
    coupling at least one first and second positioning device segments along an inner surface of at least one of a first side or a second side of the rotor blade assembly for dry-fit positioning the shear web insert, and,
    placing a plurality of spacers along at least one of a bottom face, a first end, or a second end of the shear web insert, the plurality of spacers aligned in the perimeter gap along a first side face of the shear web insert.

6. The method of claim 1, wherein the angled perimeter interface is configured such that the first gap is smaller than the second gap.

7. The method of claim 1, wherein an angle in the angled perimeter interface ranges from about 0 degrees to about 50 degrees.

8. The method of claim 1, wherein the first gap ranges from about 0 millimeters to about 30 millimeters and the second gap ranges from about 5 millimeters to about 75 millimeters.

9. The method of claim 1, further comprising applying the bonding paste using at least one injection device comprising a shoe and a nozzle.

10. The method of claim 1, further comprising overflowing the bonding paste from the perimeter gap such that it squeezes out from the perimeter gap on both the first and second side faces of the shear web insert.

11. A rotor blade assembly for a wind turbine, the rotor blade assembly comprising a first side and a second side, wherein the first side of the rotor blade assembly corresponds to one of a pressure side or a suction side of the rotor blade assembly, and an opposite second side of the rotor blade assembly corresponds to the other pressure side or suction side of the rotor blade assembly, the rotor blade assembly comprising:
- a first blade segment defining a joint end, the first blade segment including a first shear web with an angled interface at the joint end;
- a second blade segment coupled to the joint end of the first blade segment, the second blade segment including a second shear web with an angled interface at the joint end;
- at least one first connecting device coupled across at least a portion of the joint end, the at least one first connecting device coupled at least partially on a first side face of at least one of the first shear web and the second shear web;
- at least one second connecting device coupled across at least a portion of the joint end, the at least one second connecting device coupled at least partially on an opposing, second side face of at least one of the first shear web and the second shear web;
- a shear web insert positioned between the first shear web and second shear web, the shear web insert defining a perimeter gap at an angled perimeter interface between the shear web insert and the angled interfaces of the first and second shear webs; and,
- bonding paste injected into the angled perimeter interface, wherein the bonding paste is configured to overflow the perimeter gap such that the bonding paste squeezes out from the perimeter gap on both the first and second side faces of the shear web insert.

12. The assembly of claim 11, further comprising
- at least one first and second positioning device segments coupled along an inner surface of at least one of the first side or the second side of the rotor blade assembly; and,
- a plurality of spacers placed along at least one of a bottom face, a first end, or a second end of the shear web insert, the plurality of spacers aligned in the perimeter gap along the first side face of the shear web insert.

13. The assembly of claim 12, wherein the angled perimeter interface comprises a first gap defined between the first side face of the shear web insert and the at least one adjacent surface, and a second gap defined between the second side face of the shear web insert and the at least one adjacent surface.

14. The assembly of claim 13, wherein the angled perimeter interface is configured such that the first gap is smaller than the second gap.

15. The assembly of claim 14, wherein the angle in the angled perimeter interface ranges from about 0 degrees to about 50 degrees.

16. A connecting device assembly, comprising;
- first and second connecting devices each comprising at least one pre-fabricated clip comprising horizontal and vertical portions, the horizontal portions of the at least one pre-fabricated clip coupled to at least one of an inner surface of a first side of the rotor blade assembly or an inner surface of an opposite, second side of the rotor blade assembly, wherein the vertical portions of at least two of the pre-fabricated clips extend from the respective horizontal portions in opposing directions a sufficient distance to couple with an opposing vertical portion.

17. The connecting device assembly of claim 16, wherein the vertical portions of at least two pre-fabricated clips extend from the respective horizontal portions in opposing directions a sufficient distance to couple with an opposing vertical portion.

* * * * *